United States Patent
Yokose et al.

(10) Patent No.: US 9,723,310 B2
(45) Date of Patent: Aug. 1, 2017

(54) IMAGE PROCESSING DEVICE, IMAGE PROCESSING METHOD, AND NON-TRANSITORY COMPUTER-READABLE MEDIUM

(71) Applicant: FUJI XEROX CO., LTD., Tokyo (JP)

(72) Inventors: Taro Yokose, Kanagawa (JP); Tomoki Taniguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 208 days.

(21) Appl. No.: 14/606,300

(22) Filed: Jan. 27, 2015

(65) Prior Publication Data

US 2016/0088315 A1 Mar. 24, 2016

(30) Foreign Application Priority Data

Sep. 24, 2014 (JP) ................. 2014-193875

(51) Int. Cl.
| | | |
|---|---|---|
| *H04N 19/119* | (2014.01) | |
| *H04N 19/124* | (2014.01) | |
| *H04N 19/132* | (2014.01) | |
| *H04N 19/176* | (2014.01) | |
| *H04N 19/61* | (2014.01) | |
| *H04N 19/18* | (2014.01) | |
| *H04N 19/184* | (2014.01) | |
| *H04N 19/63* | (2014.01) | |

(52) U.S. Cl.
CPC ......... *H04N 19/119* (2014.11); *H04N 19/124* (2014.11); *H04N 19/132* (2014.11); *H04N 19/176* (2014.11); *H04N 19/18* (2014.11); *H04N 19/184* (2014.11); *H04N 19/61* (2014.11)

(58) Field of Classification Search
CPC .... H04N 19/119; H04N 19/17; H04N 19/186; H04N 19/625; H04N 21/42607
See application file for complete search history.

(56) References Cited

U.S. PATENT DOCUMENTS

| | | | | |
|---|---|---|---|---|
| 4,876,611 A * | 10/1989 | Fischer | ............... | H04N 1/4051 358/3.07 |
| 2004/0165780 A1* | 8/2004 | Maki | ...................... | H04N 19/63 382/232 |
| 2010/0215263 A1* | 8/2010 | Imanaka | .............. | H04N 5/4401 382/166 |

FOREIGN PATENT DOCUMENTS

| | | |
|---|---|---|
| JP | H01-213085 A | 8/1989 |
| JP | H05-268480 A | 10/1993 |

* cited by examiner

*Primary Examiner* — Obafemi Sosanya
(74) *Attorney, Agent, or Firm* — Oliff PLC

(57) ABSTRACT

An image processing device includes a first subdividing unit that subdivides an image, a second subdividing unit that subdivides an image subdivided by the first subdividing unit along an axis that is independent from an axis of subdivision by the first subdividing unit, a differential unit that generates a difference between an image subdivided by the second subdividing unit and an image stored in an image storage unit, and a coding unit that codes a difference image generated by the differential unit.

7 Claims, 22 Drawing Sheets

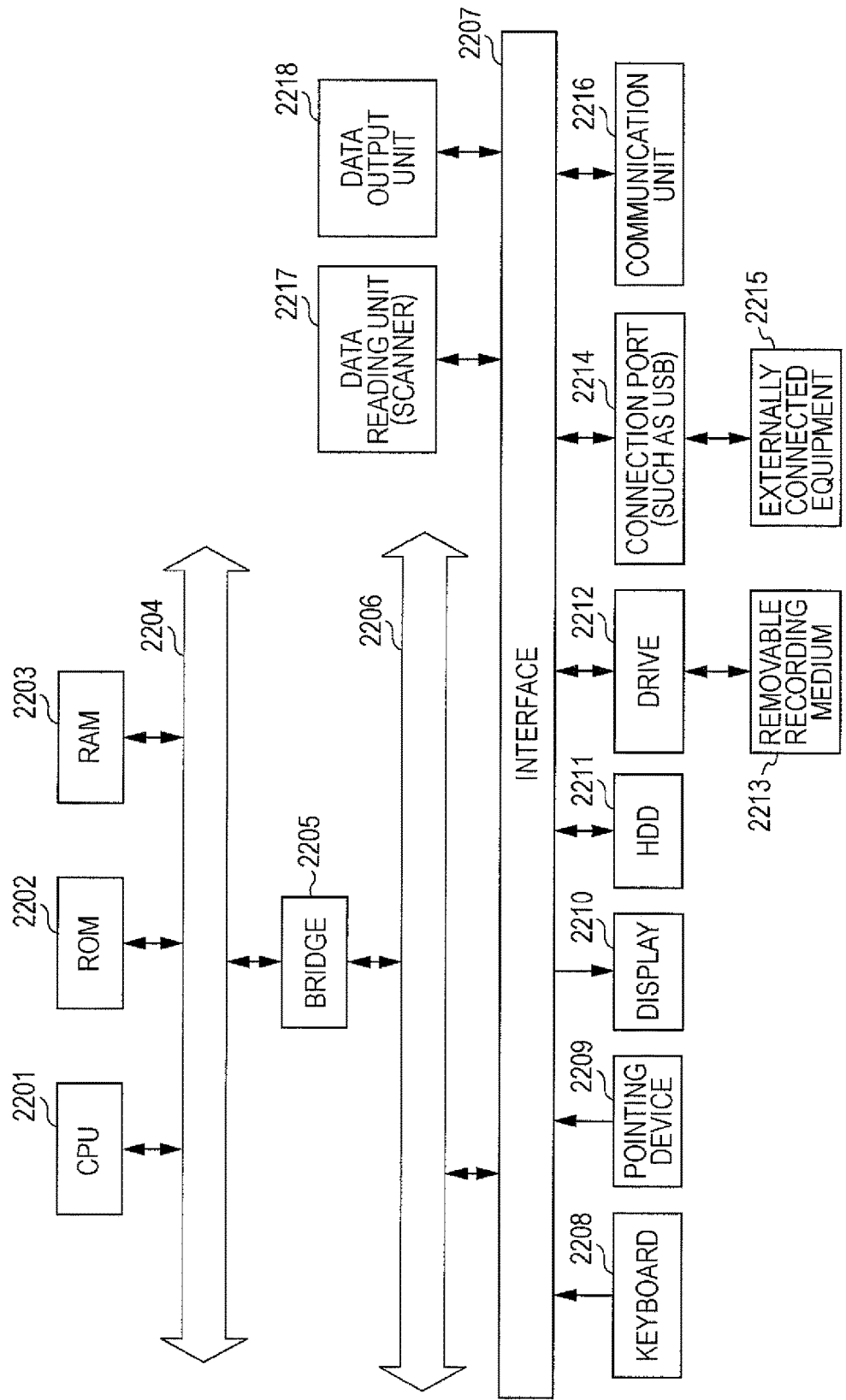

IMAGE PROCESSING DEVICE, IMAGE PROCESSING METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2014-193875 filed Sep. 24, 2014.

BACKGROUND

Technical Field

The present invention relates to an image processing device, an image processing method, and a non-transitory computer-readable medium.

SUMMARY

According to an aspect of the invention, there is provided an image processing device that includes a first subdividing unit that subdivides an image, a second subdividing unit that subdivides an image subdivided by the first subdividing unit along an axis that is independent from an axis of subdivision by the first subdividing unit, a differential unit that generates a difference between an image subdivided by the second subdividing unit and an image stored in an image storage unit, and a coding unit that codes a difference image generated by the differential unit.

BRIEF DESCRIPTION OF THE DRAWINGS

Exemplary embodiments of the present invention will be described in detail based on the following figures, wherein:

FIG. 22 is a block diagram illustrating an exemplary hardware configuration of a computer that realizes an exemplary embodiment.

DETAILED DESCRIPTION

Hereinafter, various exemplary embodiments related to realizing the present invention will be described by way of example on the basis of the drawings.

First Exemplary Embodiment

Figure 1:
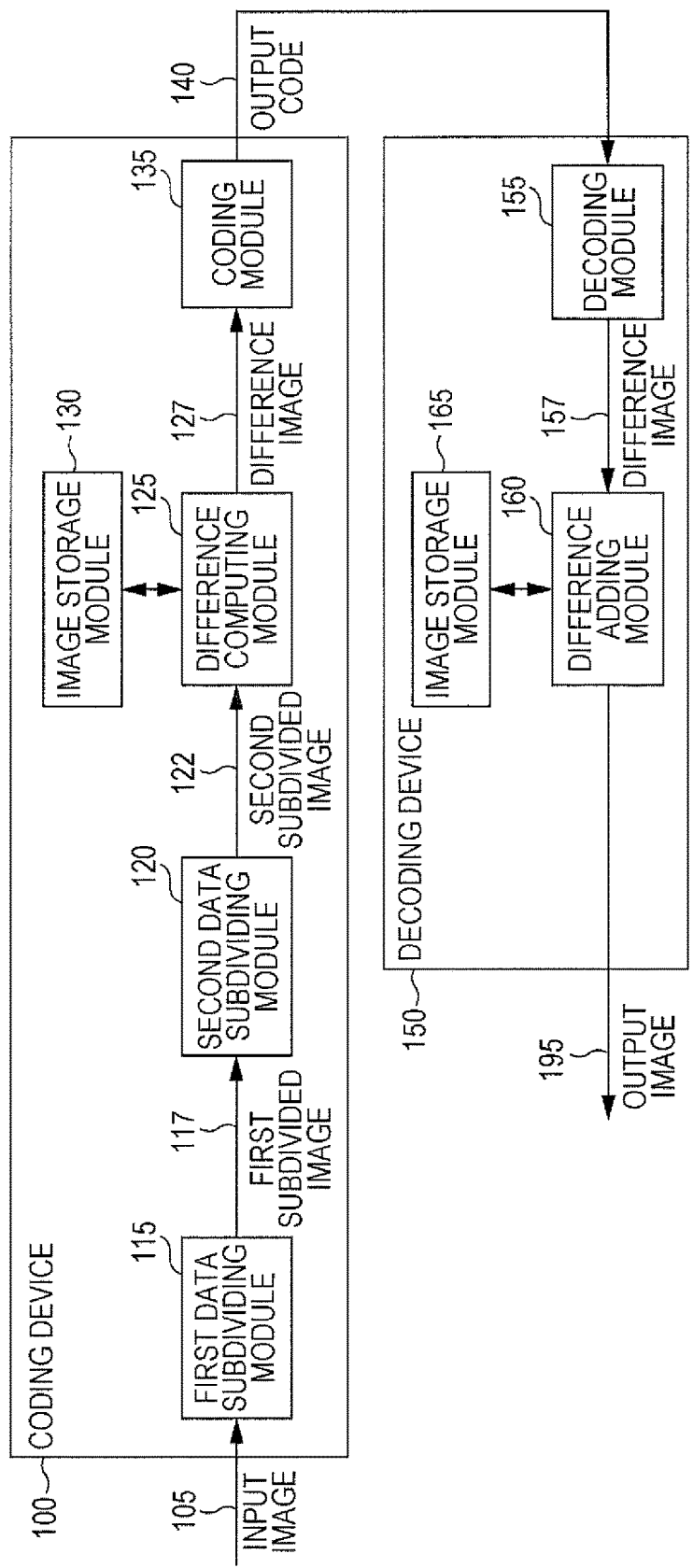
FIG. 1 is a schematic module configuration diagram for an exemplary configuration according to the first exemplary embodiment.

FIG. 1 illustrates a schematic module configuration for an exemplary configuration according to the first exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of multiple "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system" and "device" not only encompass configurations in which multiple computers, hardware, or devices are connected by a communication medium such as a network (including connections that support 1-to-1 communication), but also encompass configurations realized by a single computer, hardware, or device. The terms "device" and "system" are used interchangeably. Obviously, the term "system" does not include merely artificially arranged social constructs (social systems).

Also, every time a process is conducted by each module or every time multiple processes are conducted within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include a hard disk, random access memory (RAM), an auxiliary or external storage medium, a storage device accessed via a communication link, and a register or the like inside a central processing unit (CPU).

The coding device 100 according to the first exemplary embodiment codes an image, and as illustrated in FIG. 1, includes a first data subdividing module 115, a second data subdividing module 120, a difference computing module 125, an image storage module 130, and a coding module 135. The coding device 100 codes an input image 105 and generates an output code 140. In addition, a decoding device 150 corresponding to the coding device 100 decodes the output code 140 output as the processing result from the coding device 100, and outputs an output image 195.

In a cloud/distributed environment utilized by various devices, the appropriate image quality differs depending on the performance (specs) of the device. Also, even for the same device, the demanded image quality differs depending on the purpose of the processing. The coding device 100 attempts to realize the selective transfer of information according to demand from a device by structuring code additively.

The first data subdividing module 115 is connected to the second data subdividing module 120, receives the input image 105, and passes a first subdivided image 117 to the second data subdividing module 120. The first data subdividing module 115 subdivides the input image 105.

The second data subdividing module 120 is connected to the first data subdividing module 115 and the difference computing module 125, receives the first subdivided image 117 from the first data subdividing module 115, and passes a second subdivided image 122 to the difference computing module 125. The second data subdividing module 120 subdivides the first subdivided image 117 subdivided by the first data subdividing module 115 on an axis independent of the axis of subdivision by the first data subdividing module 115. Subsequently, the second data subdividing module 120 selects and passes a subdivided part to the difference computing module 125.

Any of resolution, tone, image position, and color component may be used as an axis of subdivision by the first data subdividing module 115 and the second data subdividing module 120, and the axis of subdivision by the second data subdividing module 120 may differ from the axis used by the first data subdividing module 115. Particularly, a tone axis and a resolution axis indicating image quality may be used (if the first data subdividing module 115 uses the tone axis, the second data subdividing module 120 uses the resolution axis, or if the first data subdividing module 115 uses the resolution axis, the second data subdividing module 120 uses the tone axis).

The difference computing module 125 is connected to the second data subdividing module 120, the image storage module 130, and the coding module 135, receives the second subdivided image 122 from the second data subdividing module 120, and passes a difference image 127 to the coding module 135. The difference computing module 125 generates a difference between the second subdivided image 122 subdivided by the second data subdividing module 120 and an image stored in the image storage module 130. In the case of the first second subdivided image 122, there is no image being stored in the image storage module 130, and thus the difference becomes the first second subdivided image 122 itself. Note that the difference is generated by a common subtraction process.

The difference computing module 125 may also store the difference output as the processing result from the difference computing module 125, and acquire the difference output as the previous processing result from the image storage module 130.

The image storage module 130 is connected to the difference computing module 125. The image storage module 130 receives and stores the difference output as the processing result from the difference computing module 125. Subsequently, the image storage module 130 passes the stored processing result of the difference computing module 125 (the previously received difference) to the difference computing module 125. The stored processing result is continually updated according to changes in the subdivided image that is received.

The coding module 135 is connected to the difference computing module 125, receives the difference image 127 from the difference computing module 125, and outputs the output code 140 to the decoding device 150. The coding module 135 codes the difference image 127 generated by the difference computing module 125. The coding method may use an arbitrary established technology.

The decoding device 150 includes a decoding module 155, a difference adding module 160, and an image storage module 165.

The decoding module 155 is connected to the difference adding module 160, receives the output code 140 from the coding device 100, and passes a difference image 157 to the difference adding module 160. The decoding module 155 decodes the output code 140 (an inverse process of the coding by the difference computing module 125).

The difference adding module 160 is connected to the decoding module 155 and the image storage module 165, receives the difference image 157 from the decoding module 155, and outputs the output image 195. The difference adding module 160 adds together the difference image 157 decoded by the decoding module 155 and an image stored in the image storage module 165 (an inverse process of the difference computing module 125). In the case of the first difference image 157, there is not image being stored in the image storage module 165, and the added result becomes the first difference image 157 itself.

The image storage module 165 is connected to the difference adding module 160. The image storage module 165 receives and stores the processing result from the difference adding module 160. Subsequently, the image storage module 165 passes the stored processing result of the difference adding module 160 (the previously received added result) to the difference adding module 160.

Figure 2:
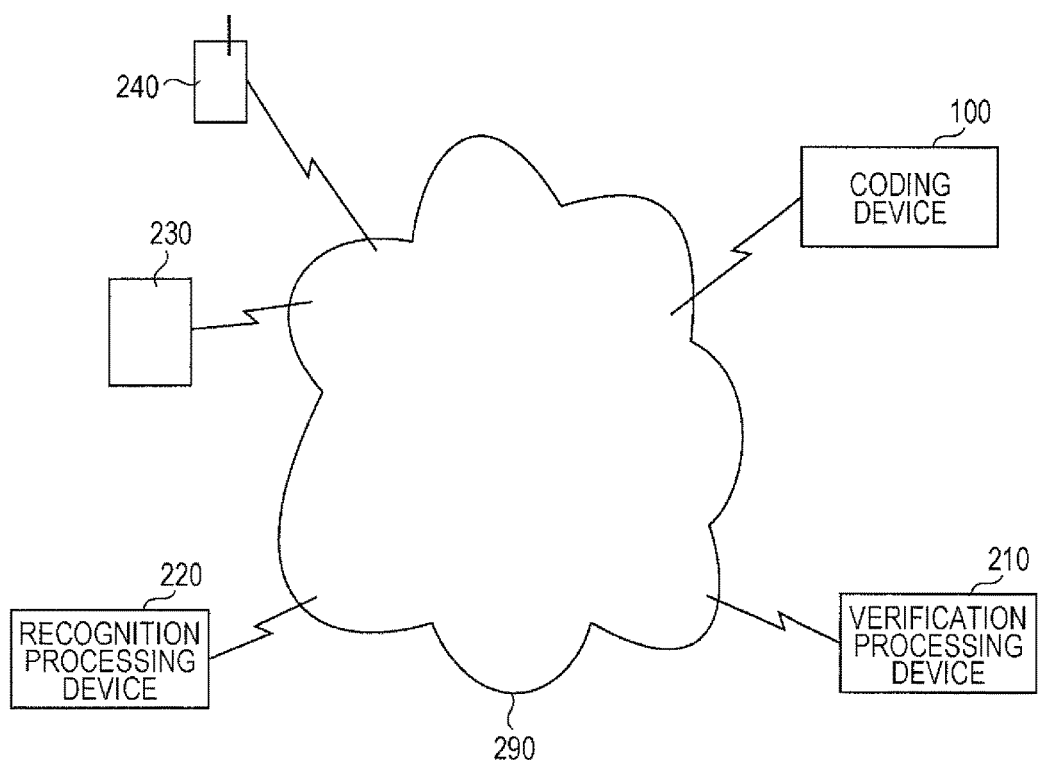
FIG. 2 is an explanatory diagram illustrating an exemplary configuration of a system utilizing an exemplary embodiment.

FIG. 2 is an explanatory diagram illustrating an exemplary configuration of a system utilizing an exemplary embodiment (including the exemplary embodiments discussed later).

A coding device 100, a verification processing device 210, a recognition processing device 220, a presentation terminal 230, and a mobile terminal 240 are interconnected via a communication network 290. The communication network 290 may be wireless, wired, or a combination of the two, and may use the Internet or the like as a communication infrastructure, for example.

The verification processing device 210, the recognition processing device 220, the presentation terminal 230, and the mobile terminal 240 are specific examples of the decoding device 150 illustrated in the example of FIG. 1. For example, the verification processing device 210 may be used in a medical facility, where the reproduction of high-range and high-frequency images is demanded. In the recognition processing device 220, which conducts character recognition or the like, and the presentation terminal 230, which presents a web-based display, the reproduction of low-range but high-frequency images is demanded to reduce transmission time. In the mobile terminal 240, which has a small screen compared to the verification processing device 210 and the like, the reproduction of high-range but low-frequency images is demanded. Because of the resolution of the screen of the mobile terminal 240, high-frequency information may be undesirable in some cases.

The coding device 100 transmits relevant code in accordance with a request from the verification processing device 210 and the like.

Figure 3:
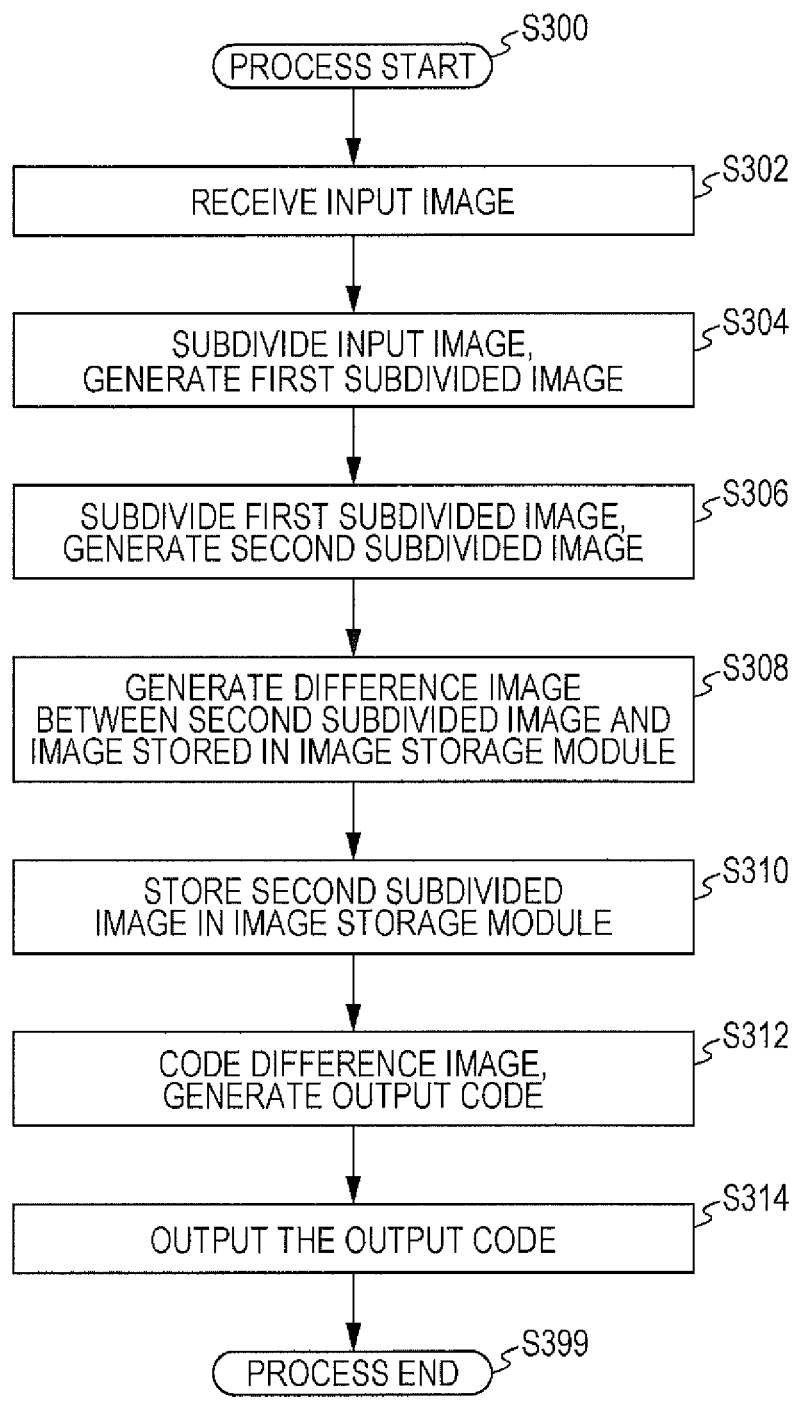
FIG. 3 is a flowchart illustrating an exemplary process according to the first exemplary embodiment.

FIG. 3 is a flowchart illustrating an exemplary process according to the first exemplary embodiment.

In step S300, the process starts.

In step S302, the first data subdividing module 115 receives the input image 105.

In step S304, the first data subdividing module 115 subdivides the input image 105, and generates the first subdivided image 117.

In step S306, the second data subdividing module 120 subdivides the first subdivided image 117, and generates the second subdivided image 122.

In step S308, the difference computing module 125 generates the difference image 127 between the second subdivided image 122 and the image stored in the image storage module 130.

In step S310, the difference computing module 125 stores the second subdivided image 122 in the image storage module 130.

In step S312, the coding module 135 codes the difference image 127, and generates the output code 140.

In step S314, the coding module 135 outputs the output code 140.

In step S399, the process ends.

Figure 4:
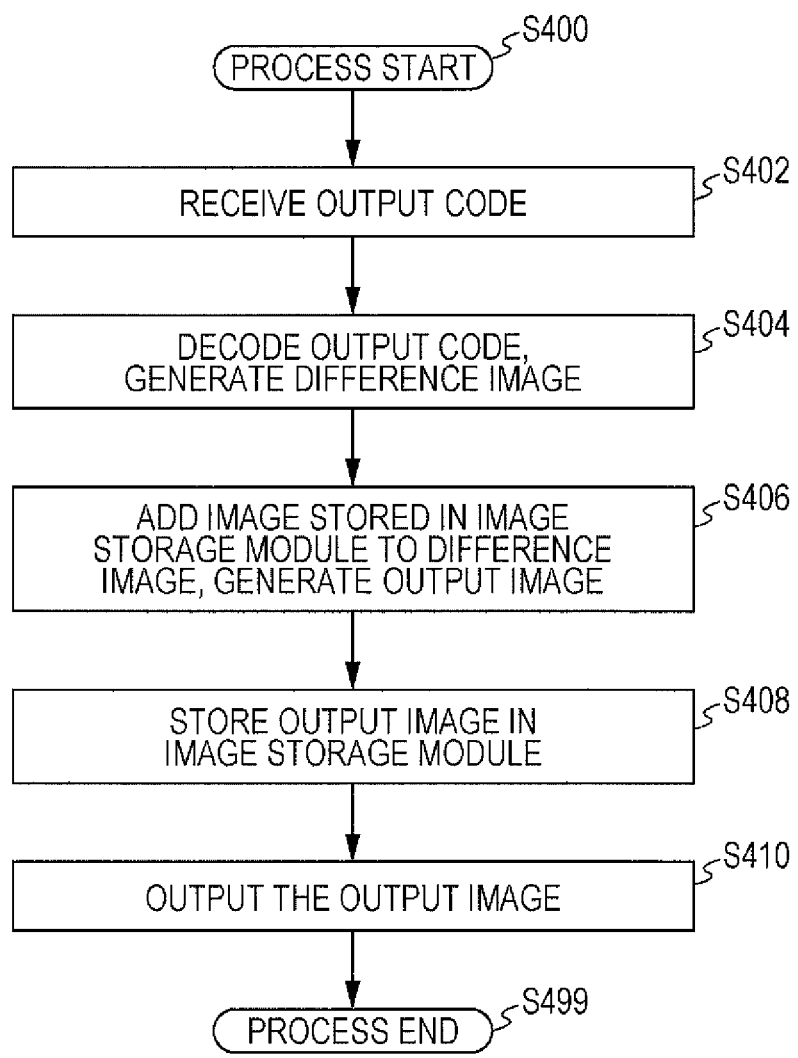
FIG. 4 is a flowchart illustrating an exemplary process according to the first exemplary embodiment.

FIG. 4 is a flowchart illustrating an exemplary process according to the first exemplary embodiment.

In step S400, the process starts.

In step S402, the decoding module 155 receives the output code 140.

In step S404, the decoding module 155 decodes the output code 140, and generates the difference image 157.

In step S406, the difference adding module 160 adds the image stored in the image storage module 165 to the difference image 157, and generates the output image 195.

In step S408, the difference adding module 160 stores the output image 195 in the image storage module 165.

In step S410, the difference adding module 160 outputs the output image 195.

In step S499, the process ends.

The example illustrated in FIGS. 5A to 5D will now be used to explain the technical significance of the first data subdividing module 115 and the second data subdividing module 120 according to the present exemplary embodiment. Note that the following is a conceptual explanation intended to aid comprehension of the exemplary embodiment.

Image quality has many facets, typically resolution and tonal range. In the graphs illustrated in the example of FIGS. 5A to 5D, the horizontal axis indicates frequency, while the vertical axis indicates tone. In other words, FIGS. 5A to 5D illustrate an example of frequency and tone as mutually independent axes. Herein, suppose that the amount of information in the original image (the image before quantization (coding)) is the original image 500 illustrated in the example of FIG. 5A. Obviously, since this image is the image before quantization, there is no lost information in terms of both frequency and tone.

Figure 5A:
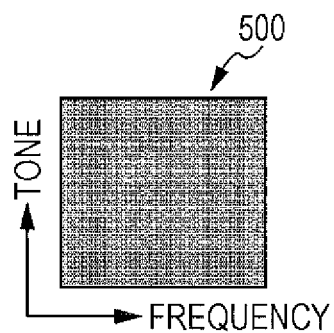
FIGS. 5A to 5D are explanatory diagrams illustrating exemplary processing according to an exemplary embodiment.
Figure 5B:
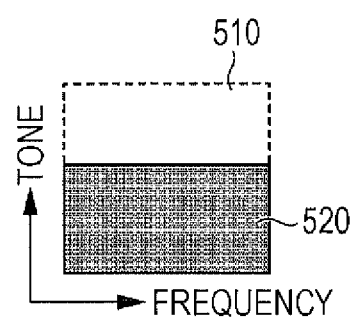

If JPEG compression is applied to the original image 500, the amount of information in the image after compression (that is, the image obtained by decoding the compressed image) becomes the JPEG information 520, and compared to the original image 500, the lost information 510 is information that is lost due to quantization, as illustrated by the example of FIG. 5B.

Figure 5C:
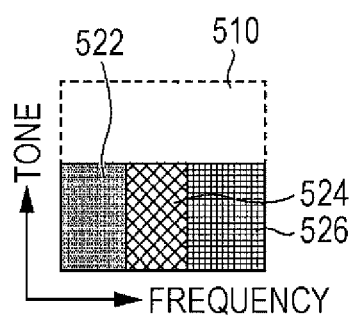

Furthermore, even if the JPEG progressive technique is adopted, during decompression, the amount of information may be regulated like the JPEG subdivided information 522, the JPEG subdivided information 524, and the JPEG subdivided information 526 only on the frequency axis, as illustrated by the example of FIG. 5C. In other words, JPEG compression is scalable on the frequency (resolution) axis only. Consequently, it is difficult to control tone using JPEG compression, a technology of the related art that scales according to frequency only. The information lost by tone quantization may not be interpolated later. On the other hand, attempting to not lose information means that the overall compression rate is lowered.

Accordingly, the present exemplary embodiment is configured to enable image information to be subdivided on multiple independent axes, and additively decompressed. In other words, during decompression, frequency and tone are freely selectable, as illustrated in the example of FIG. 5D.

Consequently, for each axis, it is possible to acquire just the information that is relevant to the user. In addition, the image transmission time may be reduced correspondingly.

Figure 5D:
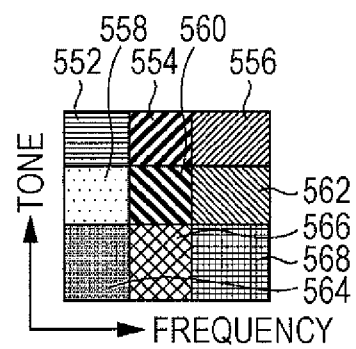

Specifically, on a device such as the mobile terminal 240 having a small screen illustrated in the example of FIG. 2 (or a color correction processing device), in order to reproduce images with high tone and low frequency, the subdivided information 552, the subdivided information 558, and the subdivided information 564 illustrated in FIG. 5D may be received and decompressed, for example. High-frequency information may be omitted in some cases due to the resolution constraints of the mobile terminal 240 or the like. Also, on a device such as the recognition processing device 220 or the presentation terminal 230 illustrated in the example of FIG. 2 (or a character recognition device), in order to reproduce images with low tone and high frequency, the subdivided information 564, the subdivided information 566, and the subdivided information 568 illustrated in FIG. 5D may be transmitted, for example. In this case, high-tone information may be omitted due to constraints on transmission time. Also, on the verification processing device 210 illustrated in the example of FIG. 2, in order to reproduce images with high tone and high frequency, the subdivided information 552 to 568 illustrated in FIG. 5D may be transmitted, for example. In this case, information similar to the original image may be demanded.

Also, by configuring an upper limit value on an axis of subdivision according to the physical constraints of the image output device used by a user, the user becomes able to select just the information that is suitable, even without knowledge about the image to acquire.

Generally, subdividing an image increases the amount of information. Subdividing techniques that minimize the increase in the amount of information are described below. Provided that a certain event is a joint event of a and b, the information I(a, b) may be expanded as in the following Math. (1).

$$p(a, b) = p(a)p(b \mid a) \quad [\text{Math. 1}]$$

$$I(a, b) = \sum_{a,b} p(a, b) \log p(a, b)$$

$$= \sum_{a,b} p(a)p(b \mid a) \log(p(a)p(b \mid a))$$

$$= \sum_{a,b} p(a)p(b \mid a)(\log p(a) + \log p(b \mid a))$$

$$= \sum_{a} p(a) \log p(a) + \sum_{a,b} p(a)p(b \mid a) \log p(b \mid a)$$

$$= I(a) + \sum_{a} p(a) I(b \mid a)$$

If a and b are independent events, p(b|a)=p(b), and thus I(a, b)=I(a)+I(b).

In other words, if a and b are independent events, I(a, b) may be subdivided into the information of a and the information of b (without increasing the amount of information).

Consequently, if the first subdivision and the second subdivision according to the present exemplary embodiment are configured so that the subdivided results are respectively independent events, the increase in the amount of information discussed above does not occur. In the present exemplary embodiment, events such as different frequency coefficients, or the relationship between the quotient and remainder of dividing tone by a quantization coefficient, may be expected to be independent events, and thus are suitable for the subdivision in the present exemplary embodiment.

Second Exemplary Embodiment

Figure 6:
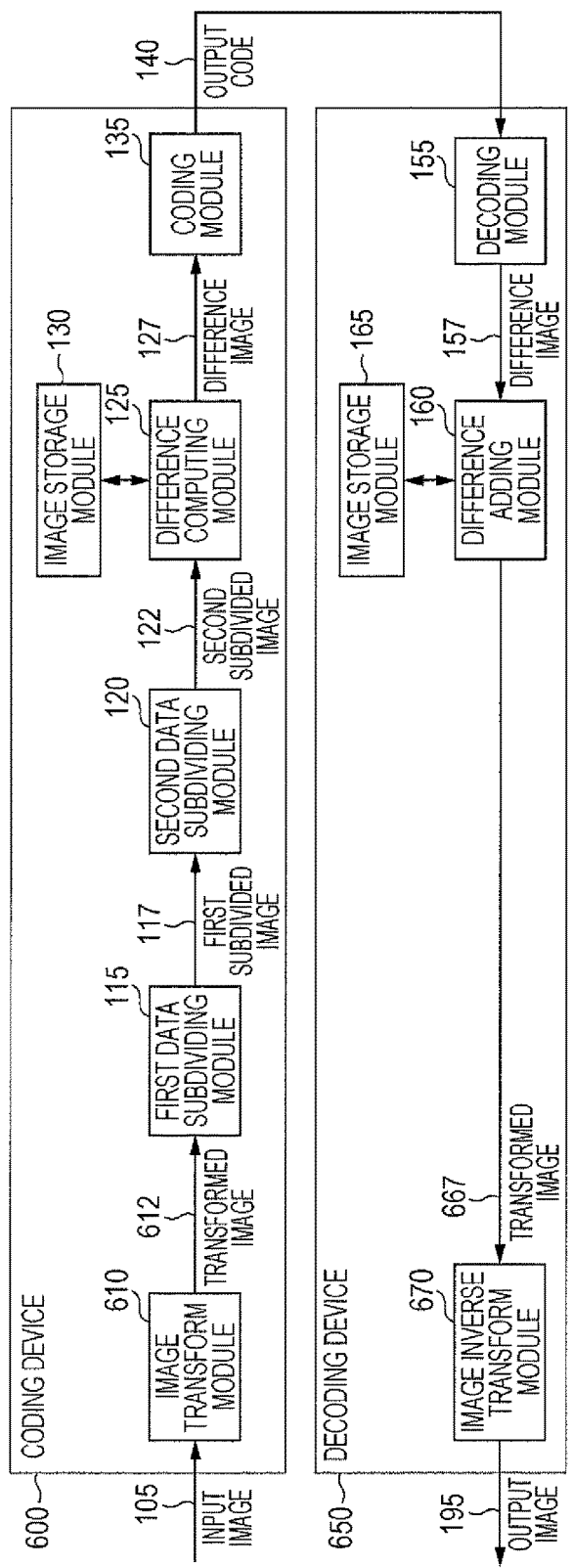
FIG. 6 is a schematic module configuration diagram for an exemplary configuration according to the second exemplary embodiment.

FIG. 6 illustrates a schematic module configuration for an exemplary configuration according to the second exemplary embodiment.

In the present exemplary embodiment, an image transform module 610 is added to the coding device 100, and an image inverse transform module 670 is added to the decoding device 150, and the data size of the output code is decreased with the addition of a transform process. Note that parts similar to the foregoing exemplary embodiment are denoted with the same signs, and repeated explanation of these parts will be reduced or omitted (this applies similarly hereinafter).

The coding device 600 includes an image transform module 610, a first data subdividing module 115, a second data subdividing module 120, a difference computing module 125, an image storage module 130, and a coding module 135.

The image transform module 610 is connected to the first data subdividing module 115, receives the input image 105, and passes a transformed image 612 to the first data subdividing module 115. The image transform module 610 transforms the input image 105. For example, a transform effective for compression, such as a frequency transform, is applied to the input image 105. Specifically, in the case of applying the coding device 600 to JPEG, the discrete cosine transform (DCT) is conducted.

The first data subdividing module 115 is connected to the image transform module 610 and the second data subdividing module 120, receives the transformed image 612 from the image transform module 610, and passes the first subdivided image 117 to the second data subdividing module 120.

The decoding device 650 includes a decoding module 155, a difference adding module 160, an image storage module 165, and an image inverse transform module 670.

The difference adding module 160 is connected to the decoding module 155, the image storage module 165, and the image inverse transform module 670, receives the difference image 157 from the decoding module 155, and passes a transformed image 667 to the image inverse transform module 670.

The image inverse transform module 670 is connected to the difference adding module 160, receives the transformed image 667 from the difference adding module 160, and outputs an output image 195. The image inverse transform module 670 generates the output image 195 by conducting the inverse process of the image transform module 610.

Third Exemplary Embodiment

Figure 7:
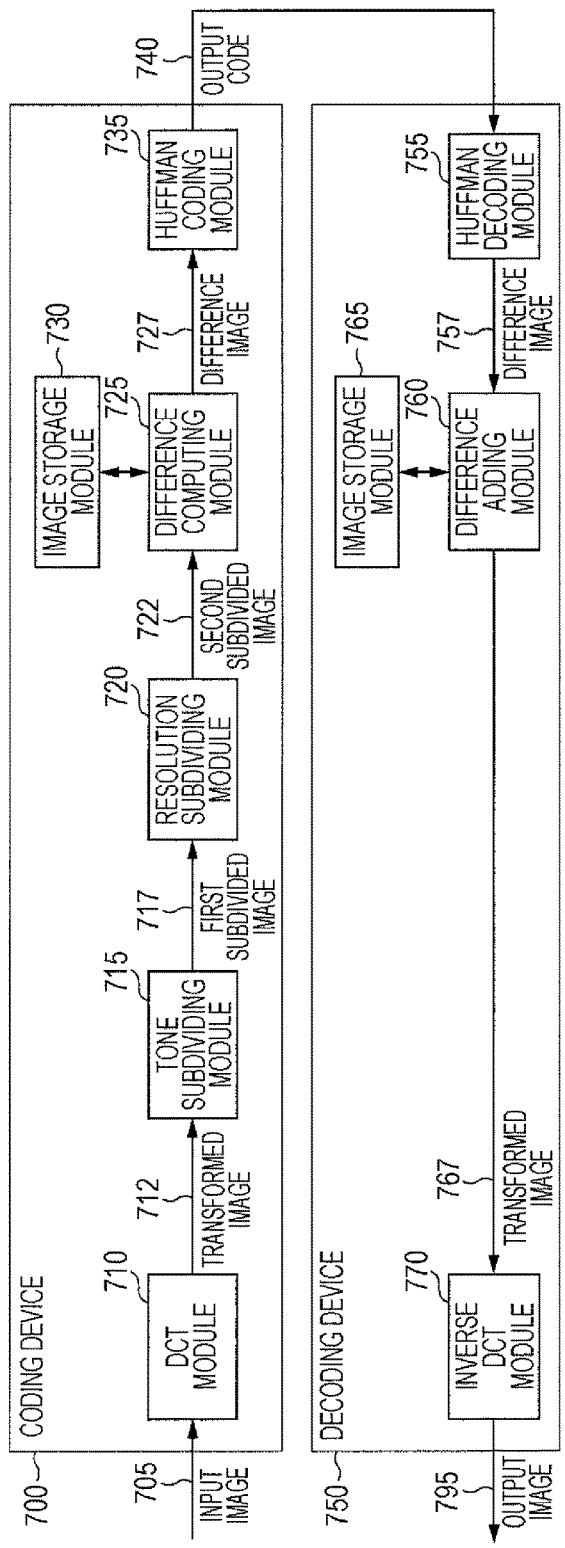
FIG. 7 is a schematic module configuration diagram for an exemplary configuration according to the third exemplary embodiment.

FIG. 7 illustrates a schematic module configuration for an exemplary configuration according to the third exemplary embodiment.

The coding device 700 includes a DCT module 710, a tone subdividing module 715, a resolution subdividing module 720, a difference computing module 725, an image storage module 730, and a Huffman coding module 735. The coding device 700 is an example of applying the coding device 600 according to the second exemplary embodiment to JPEG.

The DCT module 710 is connected to the tone subdividing module 715, receives an input image 705, and passes a transformed image 712 to the tone subdividing module 715. The DCT module 710 corresponds to the image transform module 610, and conducts the discrete cosine transform.

The tone subdividing module 715 is connected to the DCT module 710 and the resolution subdividing module 720, receives the transformed image 712 from the DCT module 710, and passes a first subdivided image 717 to the resolution subdividing module 720. The tone subdividing module 715 corresponds to the first data subdividing module 115, and conducts subdivision on the tone axis.

The resolution subdividing module 720 is connected to the tone subdividing module 715 and the difference computing module 725, receives the first subdivided image 717 from the tone subdividing module 715, and passes a second subdivided image 722 to the difference computing module 725. The resolution subdividing module 720 corresponds to the second data subdividing module 120, and conducts subdivision on the resolution axis.

The difference computing module 725 is connected to the resolution subdividing module 720, the image storage module 730, and the Huffman coding module 735, receives the second subdivided image 722 from the resolution subdividing module 720, and passes a difference image 727 to the Huffman coding module 735. The difference computing module 725 corresponds to the difference computing module 125.

The image storage module 730 is connected to the difference computing module 725. The image storage module 730 corresponds to the image storage module 130.

The Huffman coding module 735 is connected to the difference computing module 725, receives the difference image 727 from the difference computing module 725, and outputs an output code 740. The Huffman coding module 735 corresponds to the coding module 135, and conducts a Huffman coding process.

The decoding device 750 includes a Huffman decoding module 755, a difference adding module 760, an image storage module 765, and an inverse DCT module 770. The decoding device 750 is an example of applying the decoding device 650 according to the second exemplary embodiment to JPEG.

The Huffman decoding module 755 is connected to the difference adding module 760, receives the output code 740, and passes a difference image 757 to the difference adding module 760. The Huffman decoding module 755 corresponds to the decoding module 155, and conducts a Huffman decoding process.

The difference adding module 760 is connected to the Huffman decoding module 755, the image storage module 765, and the inverse DCT module 770, receives the difference image 757 from the Huffman decoding module 755, and passes a transformed image 767 to the inverse DCT module 770. The difference adding module 760 corresponds to the difference adding module 160.

The image storage module 765 is connected to the difference adding module 760. The image storage module 765 corresponds to the image storage module 165.

The inverse DCT module 770 is connected to the difference adding module 760, receives the transformed image 767 from the difference adding module 760, and outputs an output image 795. The inverse DCT module 770 corresponds to the image inverse transform module 670, and conducts the inverse discrete cosine transform (the inverse process of the DCT module 710).

Figure 8:
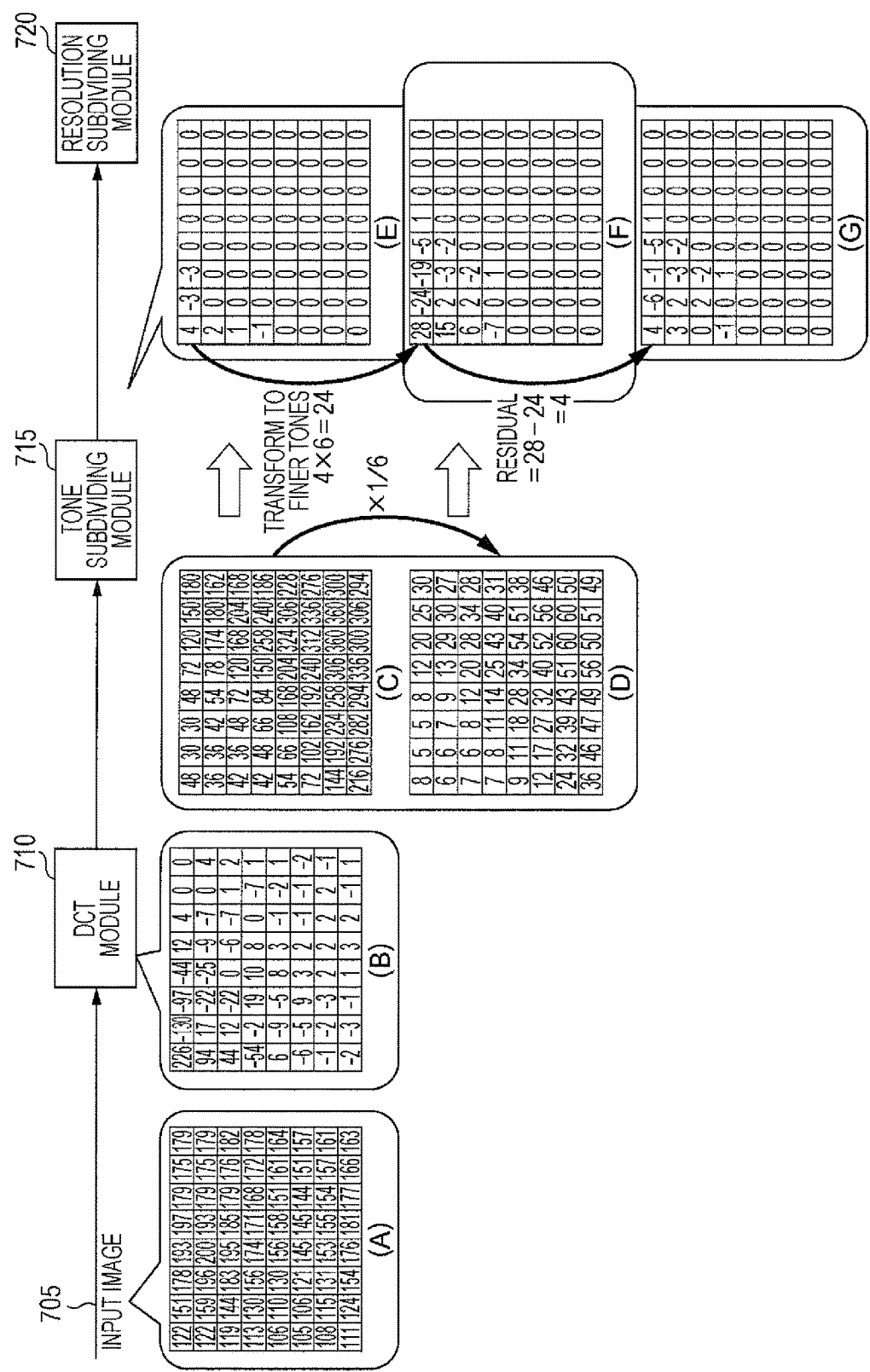
FIG. 8 is an explanatory diagram illustrating exemplary processing according to the third exemplary embodiment.
Figure 9:
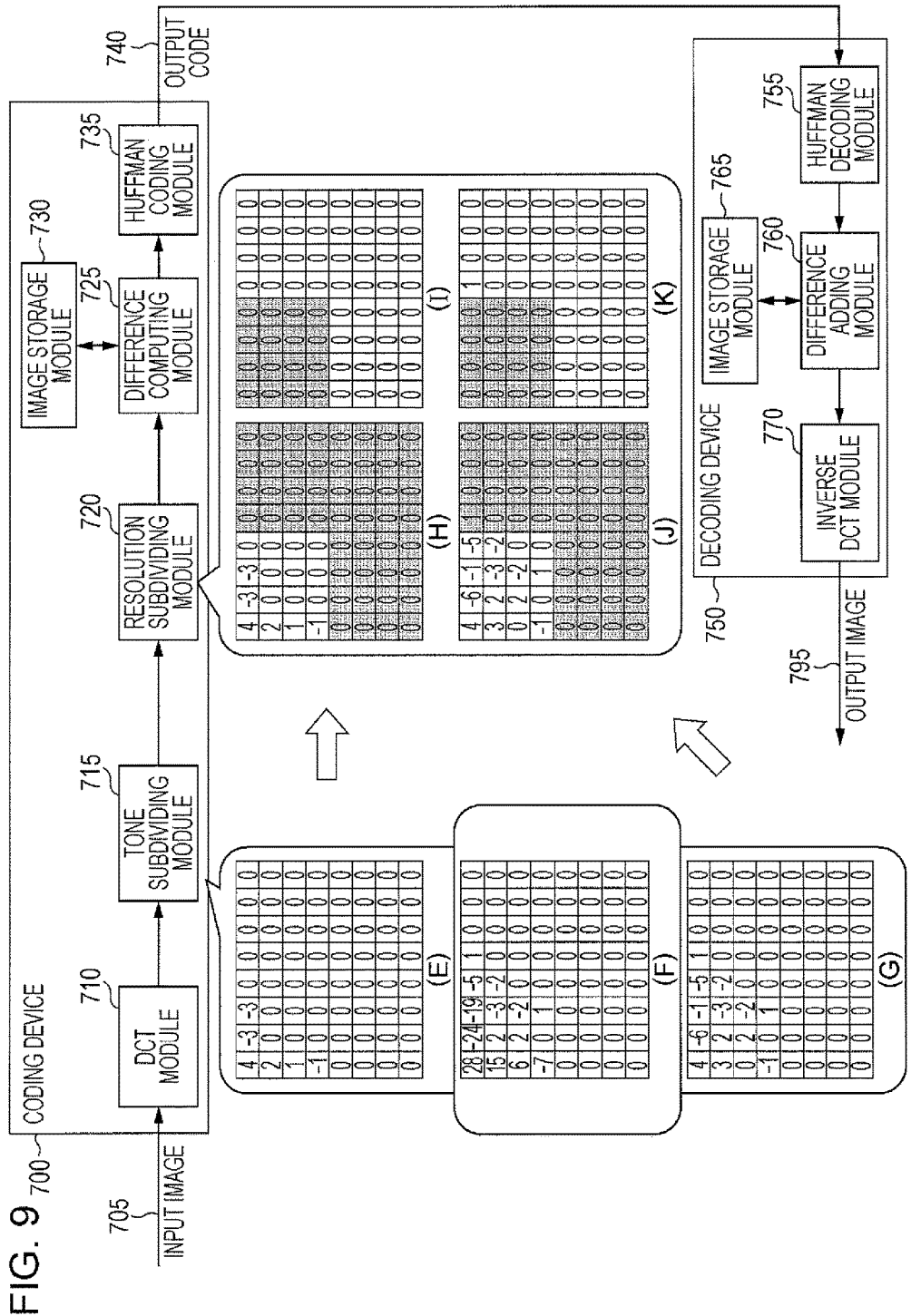
FIG. 9 is an explanatory diagram illustrating exemplary processing according to the third exemplary embodiment.

The examples in FIGS. 8 and 9 will now be used to illustrate exemplary processing according to the third exemplary embodiment.

The example labeled (A) in FIG. 8 is a specific example of the input image 705 received by the DCT module 710.

The example labeled (B) in FIG. 8 is a specific example of the transformed image 712 resulting from the DCT module 710 processing the input image 705.

The example labeled (C) in FIG. 8 is a specific example of a rough quantization table (3× standard) used by the tone subdividing module 715. The example labeled (D) in FIG. 8 is a specific example of a fine quantization table (0.5× standard) used by the tone subdividing module 715. In this example, each value is ⅙ the example labeled (C) in FIG. 8.

The example labeled (E) in FIG. 8 illustrates an intermediate result of the processing by the tone subdividing module 715, and is the quotient obtained by dividing the example labeled (B) in FIG. 8 by the example labeled (C) in FIG. 8. In other words, the example labeled (E) in FIG. 8 is a quantization into rough tones, and is the code of the low-tone component.

The example labeled (F) in FIG. 8 illustrates an intermediate result of the processing by the tone subdividing module 715, and is the quotient obtained by dividing the example labeled (B) in FIG. 8 by the example labeled (D) in FIG. 8. In other words, the example labeled (F) in FIG. 8 is a quantization into fine tones, and is not coded at this point.

The example labeled (G) in FIG. 8 is generated from the example labeled (E) in FIG. 8 and the example labeled (F) in FIG. 8. Namely, the example labeled (G) in FIG. 8 is the residual, and is the code of the high-tone component. Specifically, the upper-left value in the example labeled (G) in FIG. 8 is obtained by taking 28 (the value of the upper-left component in the example labeled (F) in FIG. 8) minus 24 (the value of the upper-left component in the example labeled (E) in FIG. 8 times 6), resulting in 4.

The example labeled (E) in FIG. 9 is the same as the example labeled (E) in FIG. 8, while the example labeled (F) in FIG. 9 is the same as the example labeled (F) in FIG. 8, and the example labeled (G) in FIG. 9 is the same as the example labeled (G) in FIG. 8. These examples illustrate the processing results from the tone subdividing module 715.

The examples labeled (H), (I), (J), and (K) in FIG. 9 indicate the processing results from the resolution subdividing module 720. The examples labeled (H) and (I) in FIG. 9 are the processing results from the resolution subdividing module 720 for the example labeled (E) in FIG. 9, while the examples labeled (J) and (K) in FIG. 9 are the processing results from the resolution subdividing module 720 for the example labeled (G) in FIG. 9. The examples labeled (H) and (J) on the left side in FIG. 9 are restricted to the 4×4 low-frequency component in the upper-left, while the examples labeled (I) and (K) on the right side in FIG. 9 are restricted to the remaining high-frequency component. Note that the gray part in each example is forcibly replaced with 0. The example labeled (H) in FIG. 9 is low-tone/low-frequency, while the example labeled (I) in FIG. 9 is low-tone/high-frequency, the example labeled (J) in FIG. 9 is high-tone/low-frequency, and the example labeled (K) in FIG. 9 is high-tone/high-frequency.

After that, the difference computing module 725 computes the difference using these four block examples (the examples labeled (H), (I), (J), and (K) in FIG. 9) in a predetermined order, and the process by the Huffman coding module 735 is conducted.

Figure 10:
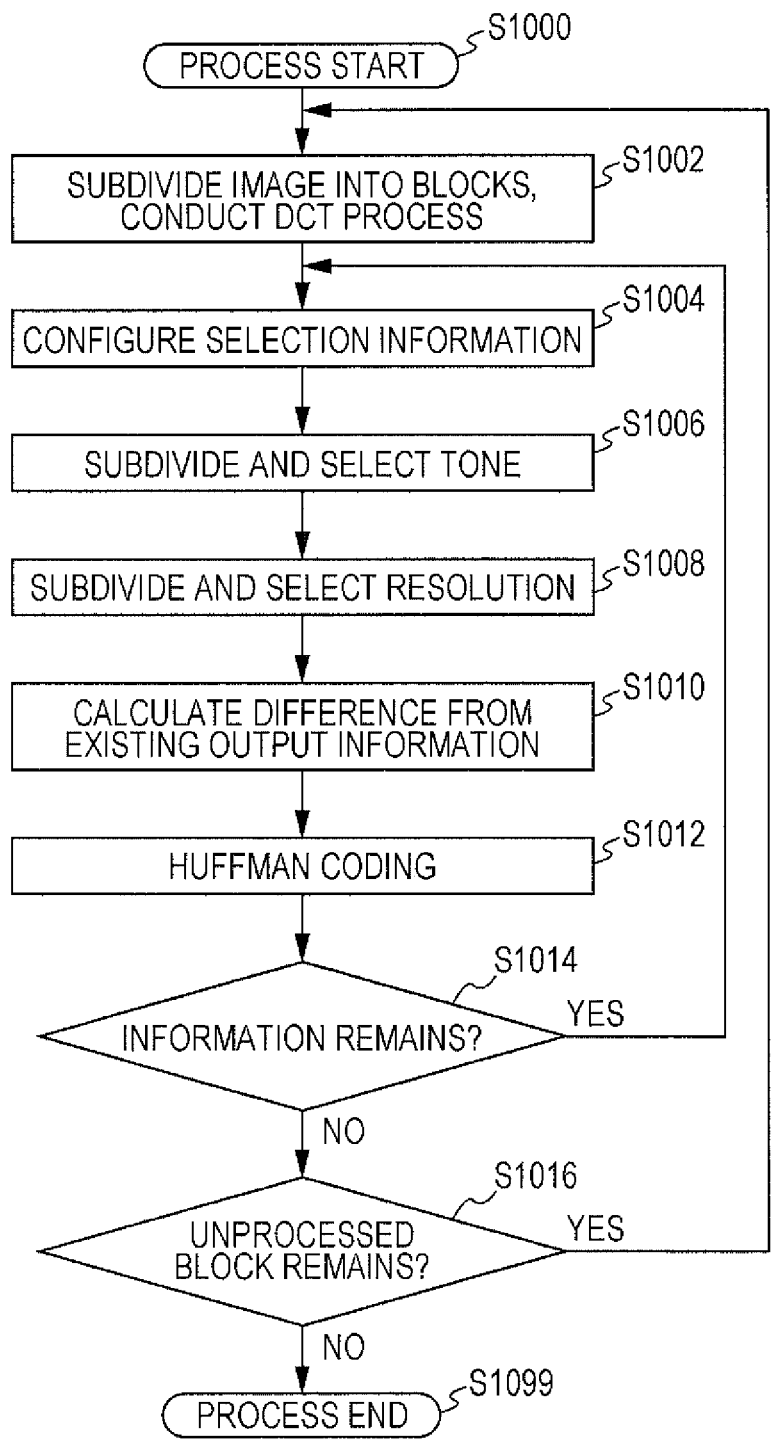
FIG. 10 is a flowchart illustrating an exemplary process according to the third exemplary embodiment.

FIG. 10 is a flowchart illustrating an exemplary process (coding process) according to the third exemplary embodiment. FIG. 10 illustrates an example of proceeding with the process on a per-block basis.

In step S1000, the process starts.

In step S1002, an image is subdivided into blocks, and a DCT process is conducted.

In step S1004, selection information is configured.

In step S1006, tone is subdivided and selected.

In step S1008, resolution is subdivided and selected.

In step S1010, the difference from existing output information is calculated.

In step S1012, Huffman coding is conducted.

In step S1014, it is determined whether or not information remains. If information remains, the process returns to step S1004, otherwise the process proceeds to step S1016.

In step S1016, it is determined whether or not an unprocessed block remains. If an unprocessed block remains, the process returns to step S1002, otherwise the process ends (step S1099).

Figure 11:
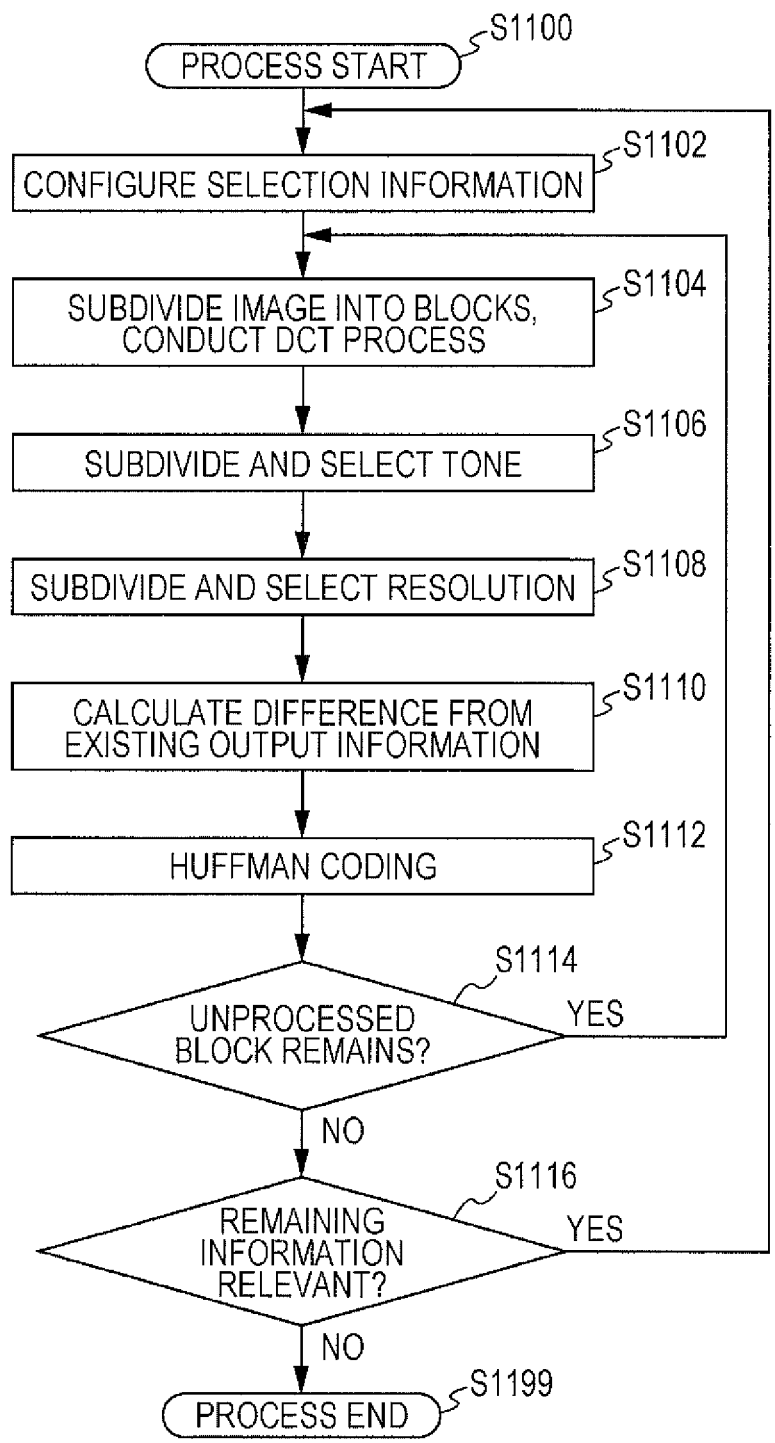
FIG. 11 is a flowchart illustrating an exemplary process according to the third exemplary embodiment.

FIG. 11 is a flowchart illustrating an exemplary process (coding process) according to the third exemplary embodiment. FIG. 11 illustrates an example of proceeding with the process on a per-selection information basis.

In step S1100, the process starts.

In step S1102, selection information is configured.

In step S1104, an image is subdivided into blocks, and a DCT process is conducted.

In step S1106, tone is subdivided and selected.

In step S1108, resolution is subdivided and selected.

In step S1110, the difference from existing output information is calculated.

In step S1112, Huffman coding is conducted.

In step S1114, it is determined whether or not an unprocessed block remains. If an unprocessed block remains, the process returns to step S1104, otherwise the process proceeds to step S1116.

In step S1116, it is determined whether or not the remaining information is relevant. If the remaining information is relevant, the process returns to step S1102, otherwise the process ends (step S1199).

Figure 12:
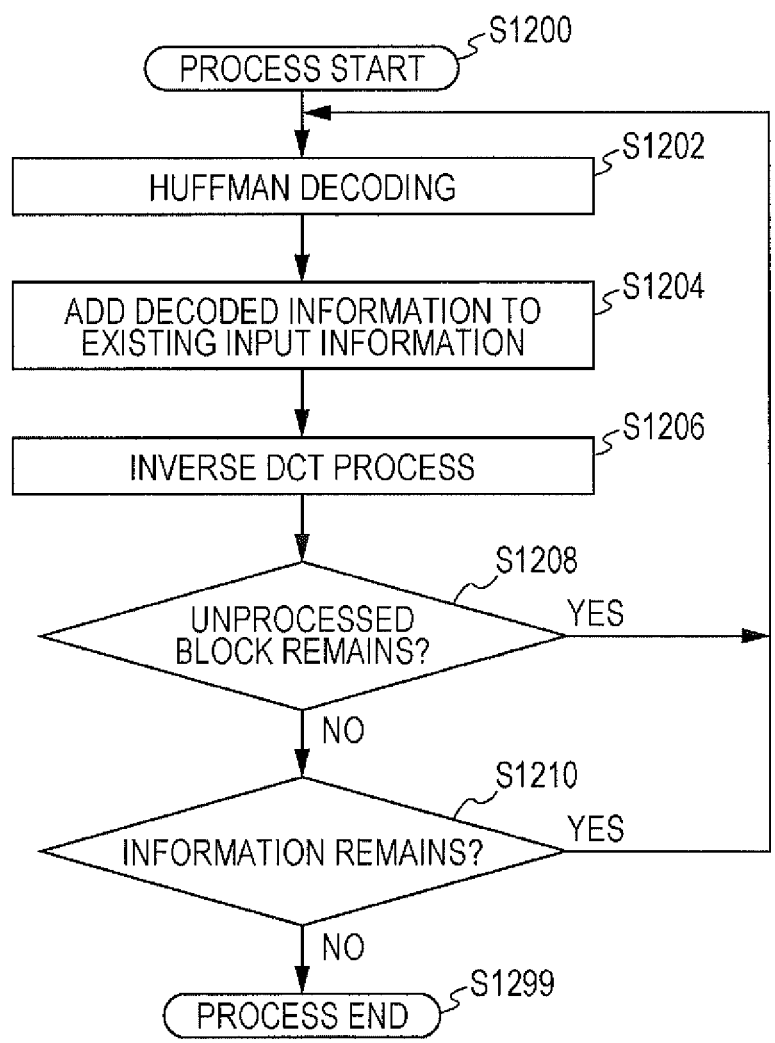
FIG. 12 is a flowchart illustrating an exemplary process according to the third exemplary embodiment.

FIG. 12 is a flowchart illustrating an exemplary process (decoding process) according to the third exemplary embodiment. FIG. 12 illustrates an example of sequential decoding.

In step S1200, the process starts.

In step S1202, Huffman decoding is conducted.

In step S1204, decoded information is added to existing input information.

In step S1206, an inverse DCT process is conducted.

In step S1208, it is determined whether or not an unprocessed block remains. If an unprocessed block remains, the process returns to step S1202, otherwise the process proceeds to step S1210.

In step S1210, it is determined whether or not information remains. If information remains, the process returns to step S1202, otherwise the process ends (step S1299).

Figure 13:
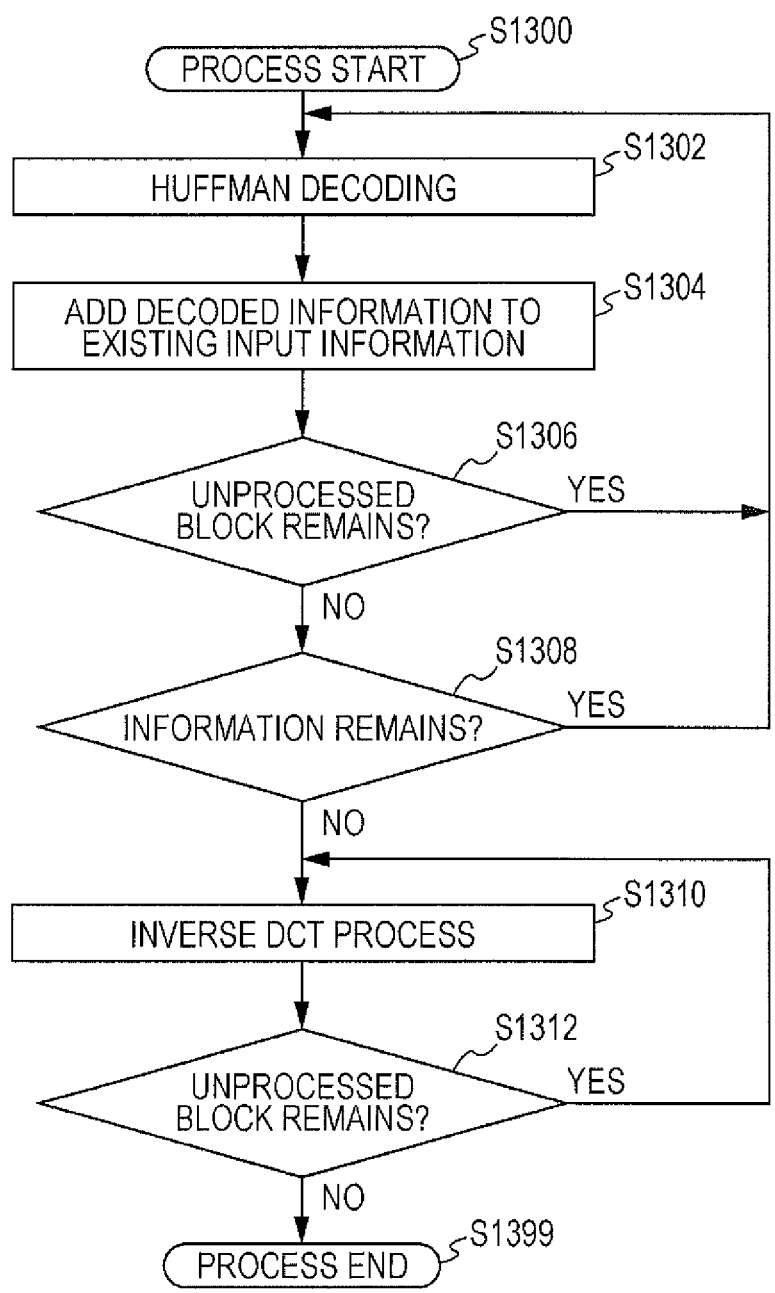
FIG. 13 is a flowchart illustrating an exemplary process according to the third exemplary embodiment.

FIG. 13 is a flowchart illustrating an exemplary process (decoding process) according to the third exemplary embodiment. FIG. 13 illustrates an example of collectively decoding information.

In step S1300, the process starts.

In step S1302, Huffman decoding is conducted.

In step S1304, decoded information is added to existing input information.

In step S1306, it is determined whether or not an unprocessed block remains. If an unprocessed block remains, the process returns to step S1302, otherwise the process proceeds to step S1308.

In step S1308, it is determined whether or not information remains. If information remains, the process returns to step S1302, otherwise the process proceeds to step S1310.

In step S1310, an inverse DCT process is conducted.

In step S1312, it is determined whether or not an unprocessed block remains. If an unprocessed block remains, the process returns to step S1310, otherwise the process ends (step S1399).

Note that whereas the number of cycles of the DCT process in step S1206 of the example in FIG. 12 is equal to the number of subdivisions times the number of blocks, the number of cycles of the DCT process in step S1310 may be reduced to equal the number of blocks, and may be implemented in the case of conducting faster processing than the process illustrated in the example of FIG. 12. In addition, intermediate processing may also be conducted in conjunction with the sequential processing illustrated in the example of FIG. 12.

Fourth Exemplary Embodiment

Figure 14:
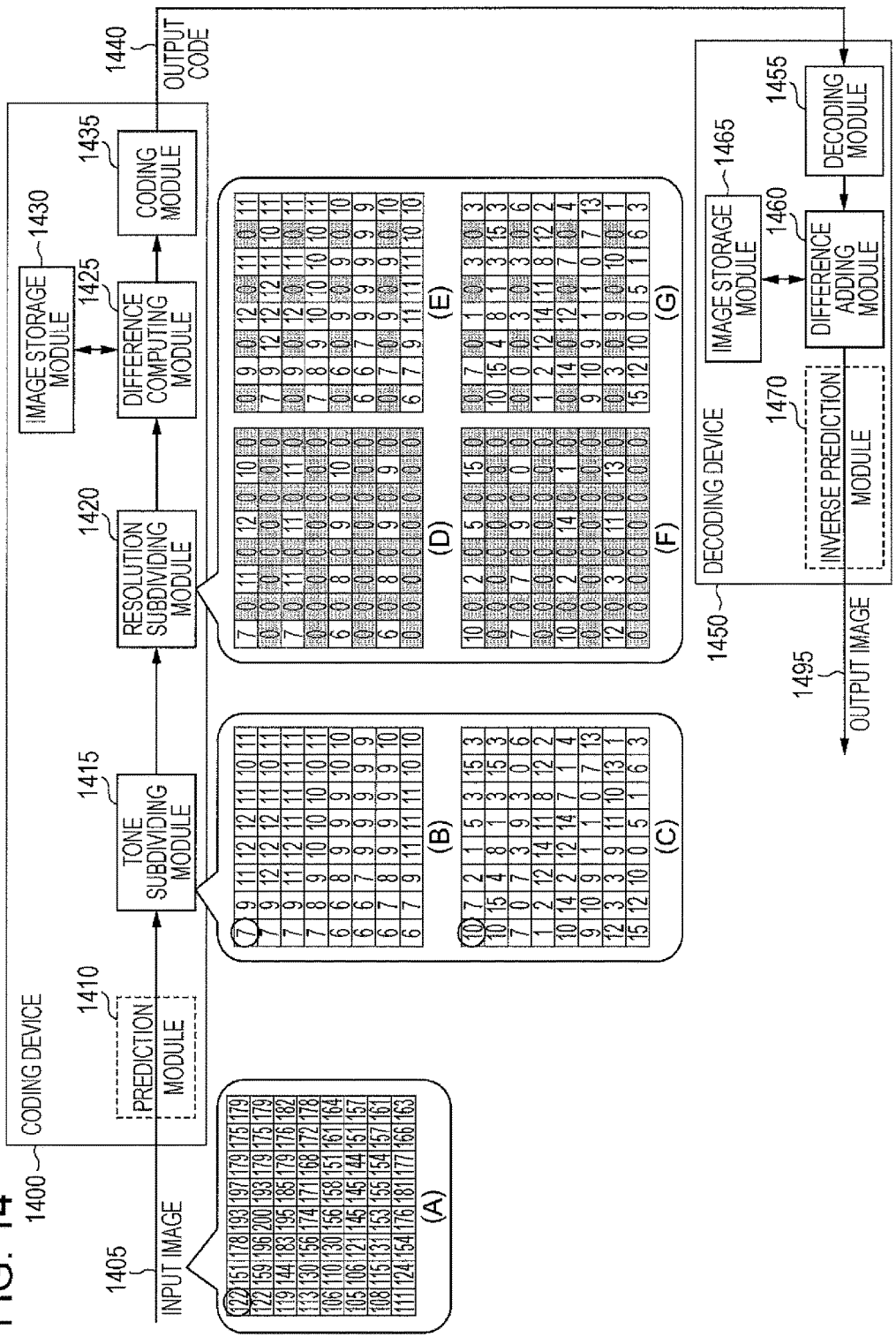
FIG. 14 is a schematic module configuration diagram for an exemplary configuration according to the fourth exemplary embodiment.

FIG. 14 illustrates a schematic module configuration for an exemplary configuration according to the fourth exemplary embodiment.

The coding device 1400 includes a tone subdividing module 1415, a resolution subdividing module 1420, a difference computing module 1425, an image storage module 1430, and a coding module 1435. A prediction module 1410 may also be added before the tone subdividing module 1415.

The prediction module 1410 is connected to the tone subdividing module 1415, and receives an input image 1405. The prediction module 1410 conducts a pixel value prediction process. The pixel value prediction process may adopt an existing processing method. The prediction residual output as the processing result from the prediction module 1410 may also be subdivided by the tone subdividing module 1415 and the like. In this case, an inverse prediction module 1470 that conducts an inverse process is added to the decoding device 1450.

The tone subdividing module 1415 is connected to the prediction module 1410 and the resolution subdividing module 1420. The tone subdividing module 1415 conducts a process similar to the tone subdividing module 715.

The resolution subdividing module 1420 is connected to the tone subdividing module 1415 and the difference computing module 1425. The resolution subdividing module 1420 conducts a process similar to the resolution subdividing module 720.

The difference computing module 1425 is connected to the resolution subdividing module 1420, the image storage module 1430, and the coding module 1435. The difference computing module 1425 conducts a process similar to the difference computing module 725.

The image storage module 1430 is connected to the difference computing module 1425. The image storage module 1430 conducts a process similar to the image storage module 730.

The coding module 1435 is connected to the difference computing module 1425, and outputs an output code 1440. The coding module 1435 conducts a process similar to the coding module 135.

The decoding device 1450 includes a decoding module 1455, a difference adding module 1460, an image storage module 1465, and an inverse prediction module 1470.

The decoding module 1455 is connected to the difference adding module 1460, and receives the output code 1440. The decoding module 1455 conducts a process similar to the decoding module 155.

The difference adding module 1460 is connected to the decoding module 1455, the image storage module 1465, and the inverse prediction module 1470. The difference adding module 1460 conducts a process similar to the difference adding module 760.

The image storage module 1465 is connected to the difference adding module 1460. The image storage module 1465 conducts a process similar to the image storage module 765.

The inverse prediction module 1470 is connected to the difference adding module 1460, and outputs an output image 1495. The inverse prediction module 1470 conducts an inverse process of the prediction module 1410.

The example labeled (A) in FIG. 14 is a specific example of the input image 1405.

The examples labeled (B) and (C) in FIG. 14 are exemplary processing results from the tone subdividing module 1415. The example labeled (B) in FIG. 14 is the result of quantizing the example labeled (A) in FIG. 14 by 16. The example labeled (C) in FIG. 14 is the residual of the example labeled (B) in FIG. 14. For example, the upper-left pixels become 16×7+10=122, matching the pixel value ("7" is the upper-left component value in the example labeled (B) in FIG. 14, "10" is the upper-left component value in the example labeled (C) in FIG. 14, and "122" is the upper-left pixel value in the example labeled (A) in FIG. 14).

The examples labeled (D), (E), (F), and (G) in FIG. 14 indicate the processing results from the resolution subdividing module 1420. The examples labeled (D) and (E) in FIG. 14 are the processing results from the resolution subdividing module 1420 for the example labeled (B) in FIG. 14, while the examples labeled (F) and (G) in FIG. 14 are the processing results from the resolution subdividing module 1420 for the example labeled (C) in FIG. 14. The examples labeled (D) and (F) in FIG. 14 are 1:4 subsampling processing results, while the examples labeled (E) and (G) in FIG. 14 are restricted to the other pixels. Note that the gray part in each example is forcibly replaced with 0.

For example, in the case of wanting to just read text characters in an image, the residual information of the tones may be discarded, or set to a lower priority.

Fifth Exemplary Embodiment

Figure 15:
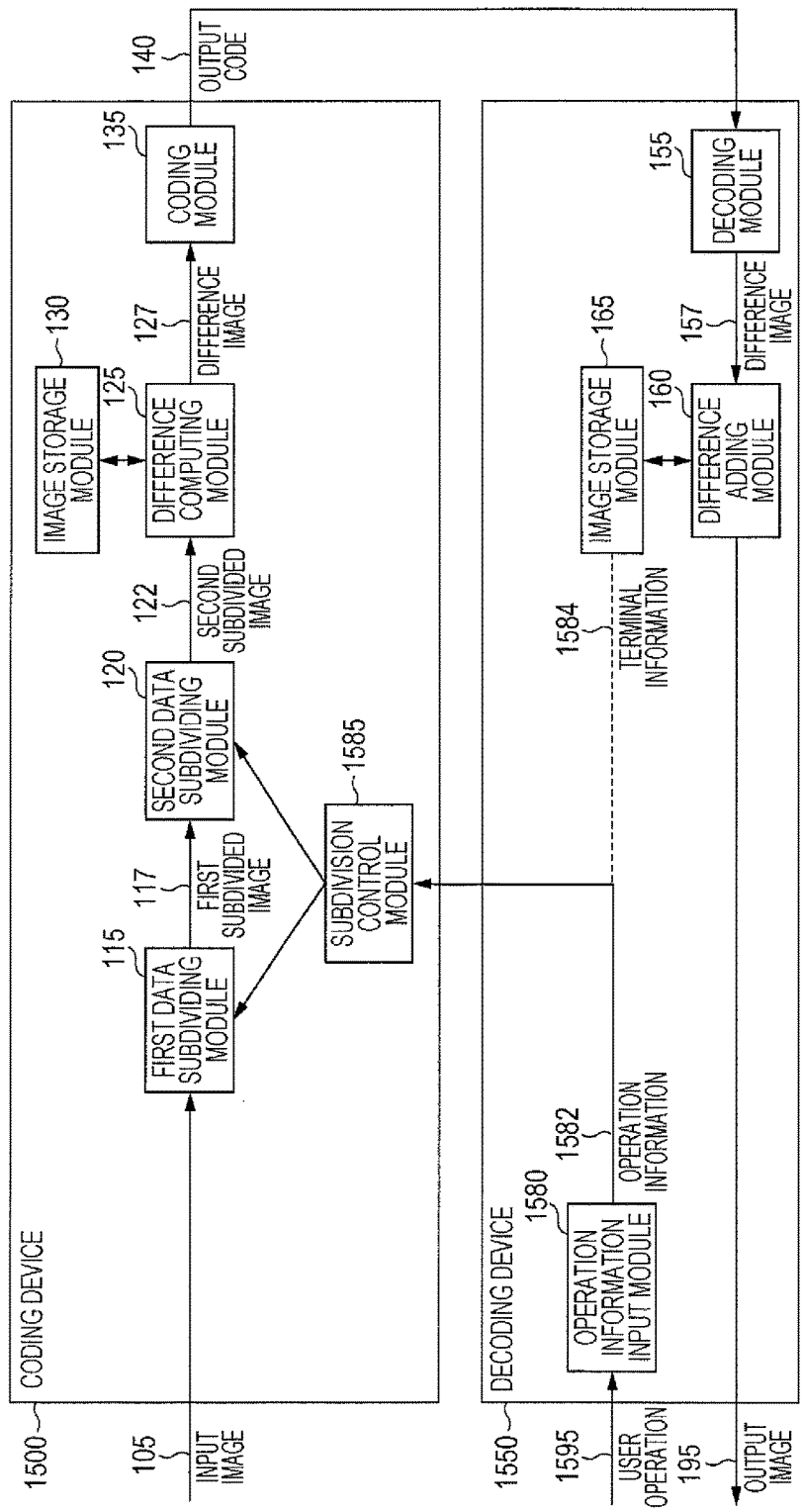
FIG. 15 is a schematic module configuration diagram for an exemplary configuration according to the fifth exemplary embodiment.

FIG. 15 illustrates a schematic module configuration for an exemplary configuration according to the fifth exemplary embodiment.

The decoding device 1550 includes a decoding module 155, a difference adding module 160, an image storage module 165, and an operation information input module 1580.

The image storage module 165 is connected to the difference adding module 160 and the operation information input module 1580, and receives terminal information 1584 from the operation information input module 1580.

The operation information input module 1580 is connected to the image storage module 165 and a subdivision control module 1585 of the coding device 1500, receives a user operation 1595, passes operation information 1582 to the subdivision control module 1585, and passes terminal information 1584 to the image storage module 165. The operation information input module 1580 inputs the operation information 1582 into the decoding device 1550, and transmits the operation information 1582 to the coding device 1500. The operation information 1582 may be information of operations such as a pinch-in or pinch-out for reducing or enlarging an image, or a flick for moving an image, for example.

The coding device 1500 includes a first data subdividing module 115, a second data subdividing module 120, a difference computing module 125, an image storage module 130, a coding module 135, and a subdivision control module 1585.

The first data subdividing module 115 is connected to the second data subdividing module 120 and the subdivision control module 1585, receives the input image 105, and passes a first subdivided image 117 to the second data subdividing module 120.

The second data subdividing module 120 is connected to the first data subdividing module 115, the difference computing module 125, and the subdivision control module 1585, receives the first subdivided image 117 from the first data subdividing module 115, and passes a second subdivided image 122 to the difference computing module 125.

The subdivision control module 1585 is connected to the first data subdividing module 115, the second data subdividing module 120, and the operation information input module 1580 of the decoding device 1550, and receives the operation information 1582 from the operation information input module 1580. The subdivision control module 1585 controls processing by the first data subdividing module 115 or the second data subdividing module 120 according to an operation on the decoding device 1550 that outputs an image coded by the coding device 1500 (the decoding device 1550 that received the output code 140), or the performance of the decoding device 1550. Specifically, the subdivision control module 1585 controls the first data subdividing module 115 and the second data subdividing module 120 according to user operation information input using the operation information input module 1580 of the decoding device 1550, or the physical constraints of the decoding device 1550. For example, by default, a constraint is imposed according to the display resolution of the decoding device 1550. If the operation information 1582 from the operation information input module 1580 is a pinch-in, the resolution upper limit is changed. Alternatively, if the operation information 1582 from the operation information input module 1580 is a flick, the spatial range over which to take the difference is restricted.

Sixth Exemplary Embodiment

Figure 16:
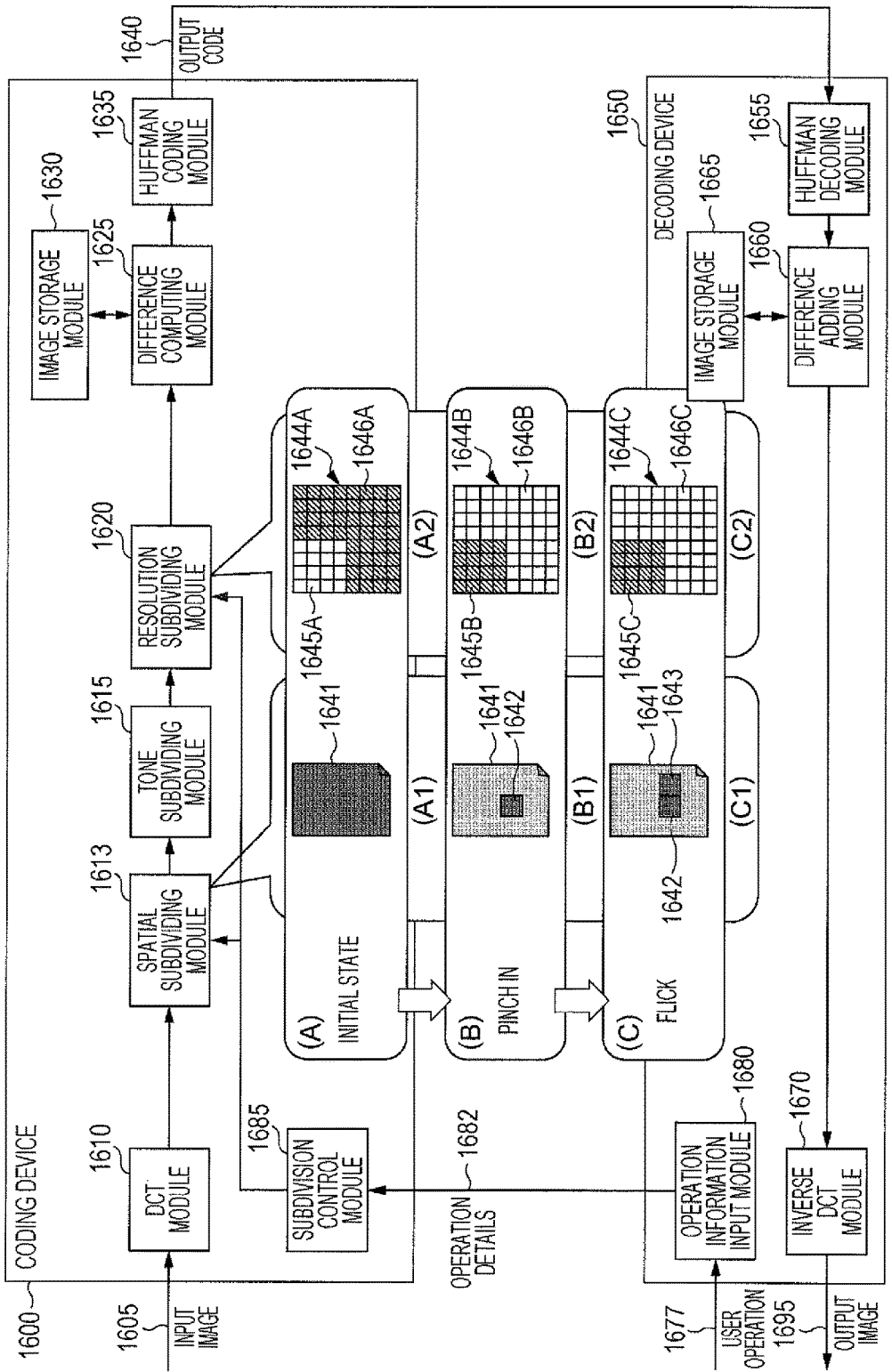
FIG. 16 is a schematic module configuration diagram for an exemplary configuration according to the sixth exemplary embodiment.

FIG. 16 illustrates a schematic module configuration for an exemplary configuration according to the sixth exemplary embodiment. The sixth exemplary embodiment adds a DCT module 1610, a spatial subdividing module 1613, and an inverse DCT module 1670 to the fifth exemplary embodiment, and realizes the first data subdividing module 115 with a tone subdividing module 1615, the second data subdividing module 120 with a resolution subdividing module 1620, the coding module 135 with a Huffman coding module 1635, and the decoding module 155 with a Huffman decoding module 1655.

The coding device 1600 includes a DCT module 1610, a spatial subdividing module 1613, a tone subdividing module 1615, a resolution subdividing module 1620, a difference computing module 1625, an image storage module 1630, a Huffman coding module 1635, and a subdivision control module 1685.

The DCT module 1610 is connected to the spatial subdividing module 1613, and receives an input image 1605.

The spatial subdividing module 1613 is connected to the DCT module 1610, the tone subdividing module 1615, and the subdivision control module 1685.

The tone subdividing module 1615 is connected to the spatial subdividing module 1613 and the resolution subdividing module 1620.

The resolution subdividing module 1620 is connected to the tone subdividing module 1615, the difference computing module 1625, and the subdivision control module 1685.

The difference computing module 1625 is connected to the resolution subdividing module 1620, the image storage module 1630, and the Huffman coding module 1635.

The image storage module 1630 is connected to the difference computing module 1625.

The Huffman coding module 1635 is connected to the difference computing module 1625, and outputs an output code 1640.

The decoding device 1650 includes a Huffman decoding module 1655, a difference adding module 1660, an image storage module 1665, an inverse DCT module 1670, and an operation information input module 1680.

The Huffman decoding module 1655 is connected to the difference adding module 1660, and receives the output code 1640.

The difference adding module 1660 is connected to the Huffman decoding module 1655, the image storage module 1665, and the inverse DCT module 1670.

The image storage module 1665 is connected to the difference adding module 1660.

The inverse DCT module 1670 is connected to the difference adding module 1660, and outputs an output image 1695.

The operation information input module 1680 is connected to the subdivision control module 1685 of the coding device 1600, receives a user operation 1677, and passes operation details 1682 to the subdivision control module 1685.

The case of the subdivision control module 1685 receiving a pinch-in and a flick as the operation details 1682 from the operation information input module 1680 in the initial state (when the operation details 1682 have not been received yet) will be described.

In the initial state, the output code 1640 output as the coded result of the entire image 1641 indicated by the example labeled (A1) in FIG. 16 is transmitted. In this case, the low-frequency region 1645A (the white part) of the whole 1644A is utilized, as indicated by the example labeled (A2) in FIG. 16. This constrains the upper limit of resolution subdivision according to the resolution limitations of the display device on the decoding device 1650 side. Note that the high-frequency region 1646A (the gray part) is replaced with 0.

In the case of receiving a pinch-in on the partial image 1642 as the operation details 1682 as indicated by the example labeled (B1) in FIG. 16, the resolution of the displayed portion rises, and thus control is conducted to deliver the difference. In this case, the difference is the high-frequency region 1646B as indicated by the example labeled (B2) in FIG. 16. Note that the low-frequency region 1645B (the gray part) is replaced with 0. Additionally, the part that is not being displayed is replaced with 0 to decrease the bit rate.

In the case of receiving a flick from the partial image 1642 to the partial image 1643 as the operation details 1682 as indicated by the example labeled (C1) in FIG. 16, the portion of interest has moved, and thus control is conducted to deliver the code of the relevant position. In this case, the difference is the high-frequency region 1646C as indicated by the example labeled (C2) in FIG. 16. Note that the low-frequency region 1645C (the gray part) is replaced with 0. Also, in the case of flicking back to the portion that was already delivered, the delivery of code may be omitted.

Figure 17:
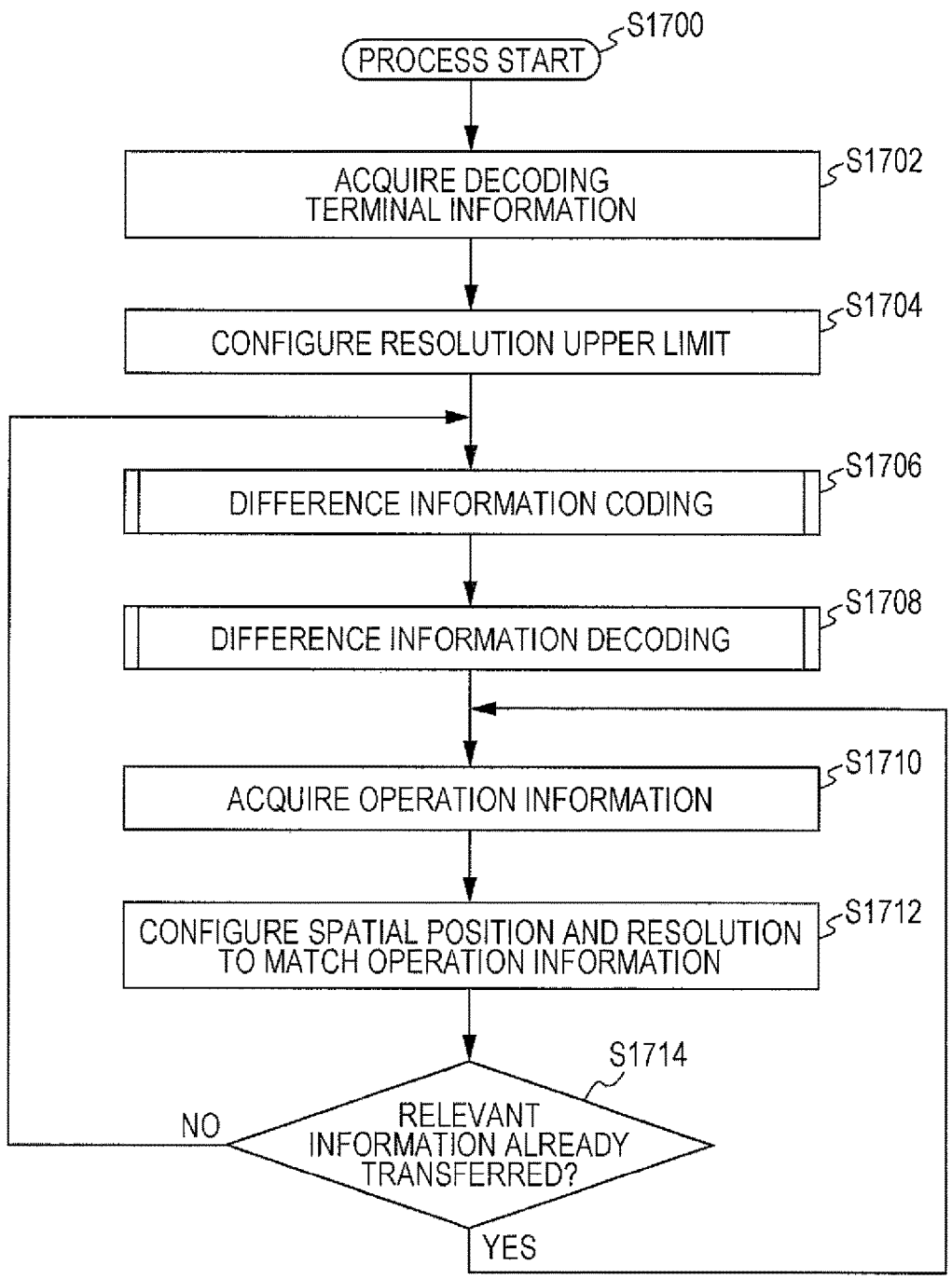
FIG. 17 is a flowchart illustrating an exemplary process according to the sixth exemplary embodiment.

FIG. 17 is a flowchart illustrating an exemplary process according to the sixth exemplary embodiment (the coding device 1600 and the decoding device 1650).

In step S1700, the process starts.

In step S1702, the coding device 1600 acquires decoding terminal information related to the decoding device 1650.

In step S1704, the coding device 1600 configures a resolution upper limit.

In step S1706, the coding device 1600 codes difference information. A detailed example of the process in step S1706 will be discussed later using the flowchart illustrate in the example of FIG. 18.

In step S1708, the decoding device 1650 decodes the difference information. A detailed example of the process in step S1708 will be discussed later using the flowchart illustrate in the example of FIG. 19.

In step S1710, the coding device 1600 acquires operation information from the decoding device 1650.

In step S1712, the coding device 1600 configures a spatial position and resolution to match the operation information.

In step S1714, the coding device 1600 determines whether or not relevant information has already been transferred. If relevant information has already been transferred, the process returns to step S1710, otherwise the process returns to step S1706.

Figure 18:
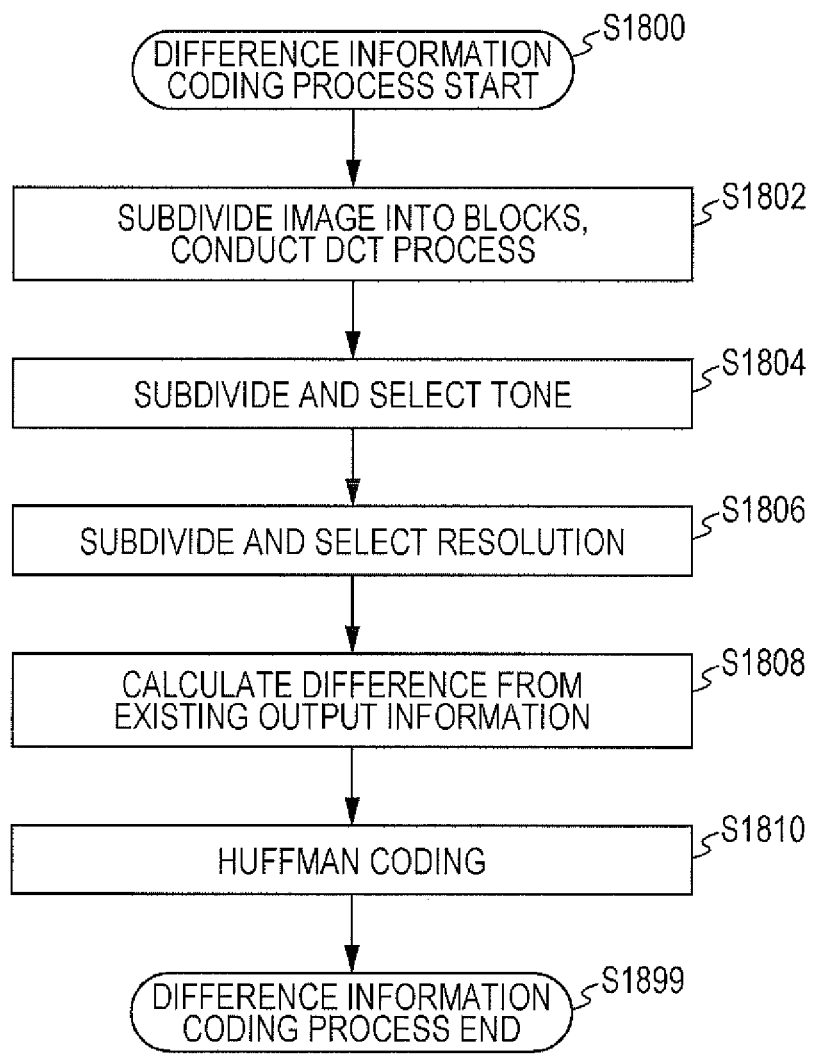
FIG. 18 is a flowchart illustrating an exemplary process according to the sixth exemplary embodiment.

FIG. 18 is a flowchart illustrating an exemplary process according to the sixth exemplary embodiment (the coding device 1600).

In step S1800, the difference information coding process starts.

In step S1802, an image is subdivided into blocks, and a DCT process is conducted.

In step S1804, tone is subdivided and selected.

In step S1806, resolution is subdivided and selected.

In step S1808, the difference from existing output information is calculated.

In step S1810, Huffman coding is conducted.

In step S1899, the difference information coding process ends.

In the exemplary process illustrated by the example of FIG. 18, code is generated on demand in accordance with an operation on the decoding side, but code may also be generated in advance, and pre-generated code may be delivered in accordance with an operation, as in the seventh exemplary embodiment discussed later.

Figure 19:
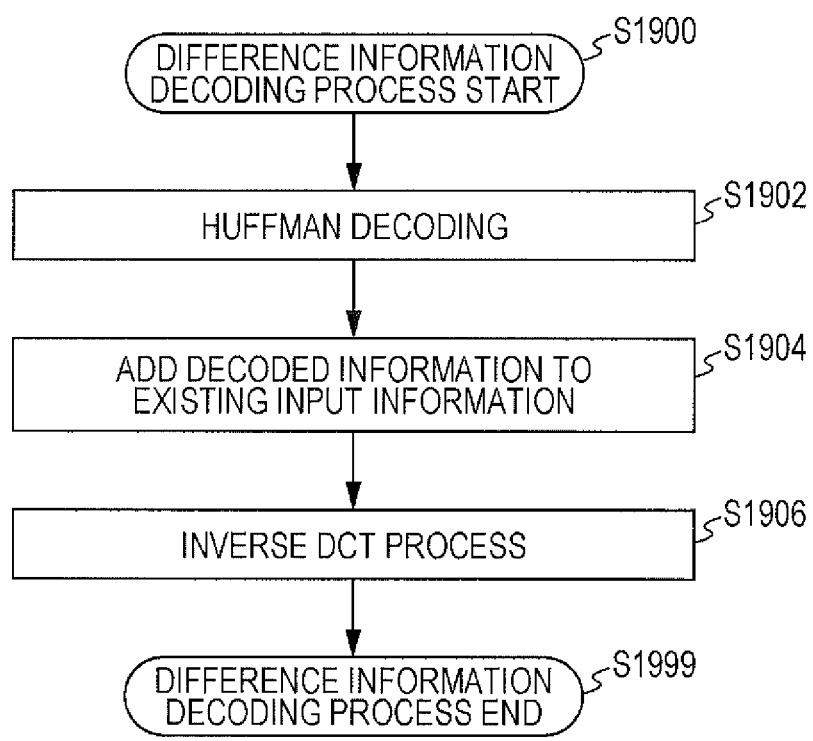
FIG. 19 is a flowchart illustrating an exemplary process according to the sixth exemplary embodiment.

FIG. 19 is a flowchart illustrating an exemplary process according to the sixth exemplary embodiment (the decoding device 1650). This exemplary process is basically sequential decoding.

In step S1900, the difference information decoding process starts.

In step S1902, Huffman decoding is conducted.

In step S1904, decoded information is added to existing input information.

In step S1906, an inverse DOT process is conducted.

In step S1999, the difference information decoding process ends.

Seventh Exemplary Embodiment

Figure 20:
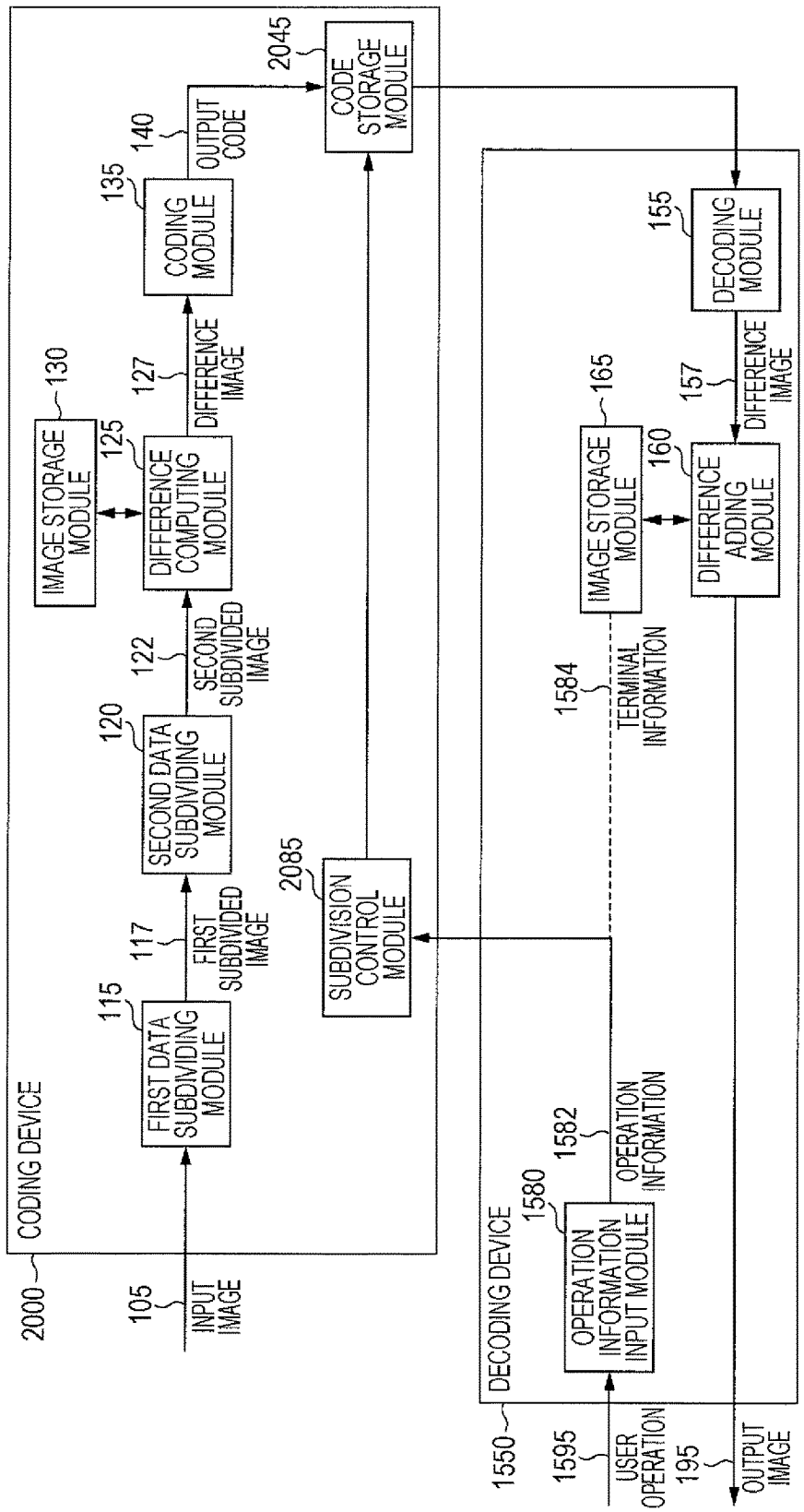
FIG. 20 is a schematic module configuration diagram for an exemplary configuration according to the seventh exemplary embodiment.

FIG. 20 is a schematic module configuration diagram for an exemplary configuration according to the seventh exemplary embodiment.

The operation information input module 1580 of the decoding device 1550 is connected to the image storage module 165 and a subdivision control module 2085 of the coding device 2000, receives a user operation 1595, passes operation information 1582 to the subdivision control module 2085, and passes terminal information 1584 to the image storage module 165.

The coding device 2000 includes a first data subdividing module 115, a second data subdividing module 120, a difference computing module 125, an image storage module 130, a coding module 135, a code storage module 2045, and a subdivision control module 2085.

The code storage module 2045 is connected to the subdivision control module 2085, the coding module 135, and the decoding module 155 of the decoding device 1550, and receives the output code 140. The code storage module 2045 stores the output code 140 output as the processing result from the coding module 135.

The subdivision control module 2085 is connected to the code storage module 2045 and the operation information input module 1580 of the decoding device 1550, and receives the operation information 1582 from the operation information input module 1580. The subdivision control module 2085 controls the selecting of code stored in the code storage module 2045 according to an operation on the decoding device 1550 that outputs an image coded by the coding device 2000 (the decoding device 1550 that received the output code 140), or the performance of the decoding device 1550.

Eighth Exemplary Embodiment

Figure 21:
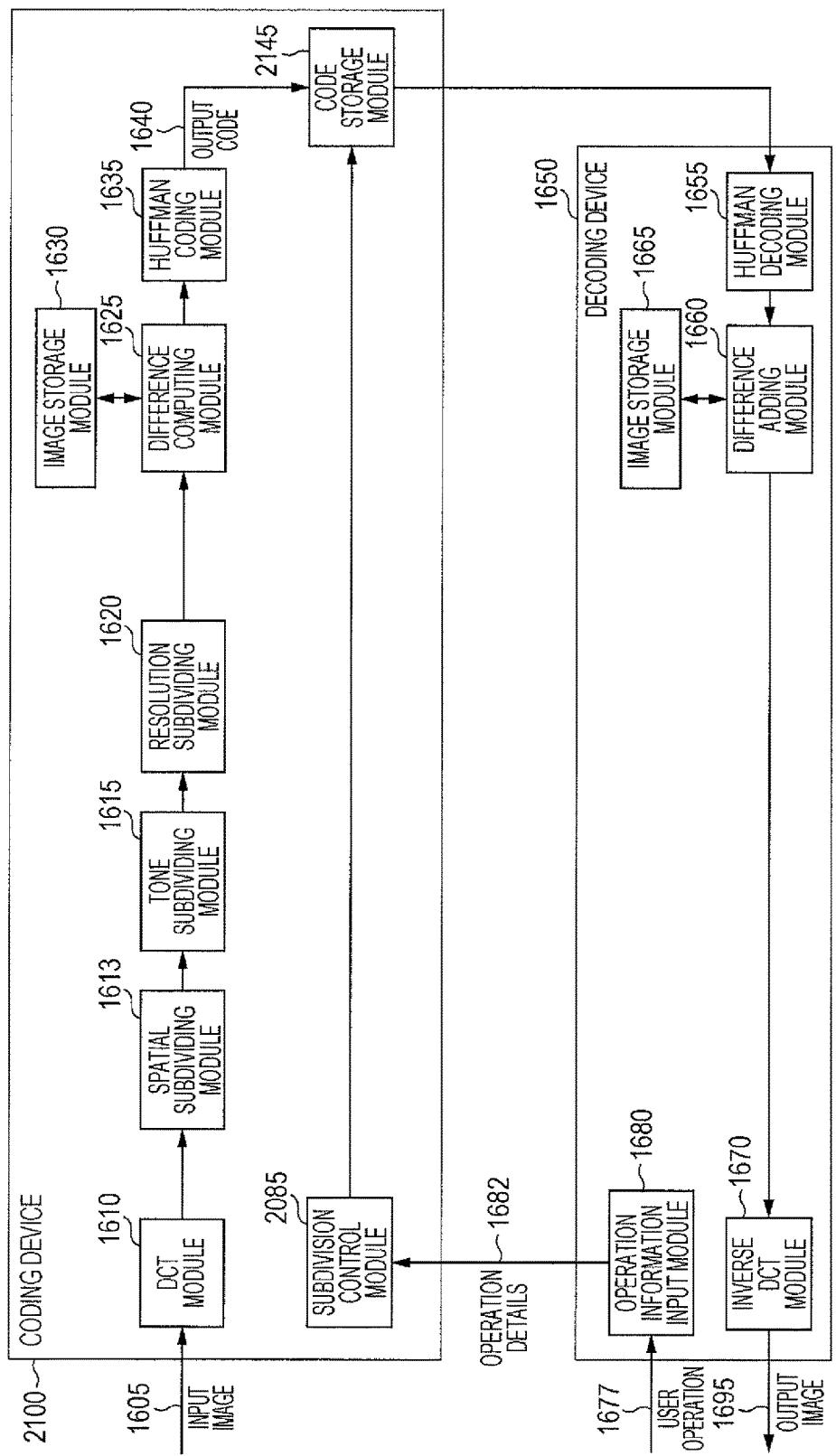
FIG. 21 is a schematic module configuration diagram for an exemplary configuration according to the eighth exemplary embodiment.

FIG. 21 is a schematic module configuration diagram for an exemplary configuration according to the eighth exemplary embodiment. The eighth exemplary embodiment adds a DCT module 1610, a spatial subdividing module 1613, and an inverse DCT module 1670 to the seventh exemplary embodiment, and realizes the first data subdividing module 115 with a tone subdividing module 1615, the second data subdividing module 120 with a resolution subdividing module 1620, the coding module 135 with a Huffman coding module 1635, and the decoding module 155 with a Huffman decoding module 1655.

The coding device 2100 includes a DCT module 1610, a spatial subdividing module 1613, a tone subdividing module 1615, a resolution subdividing module 1620, a difference computing module 1625, an image storage module 1630, a Huffman coding module 1635, a subdivision control module 2085, and a code storage module 2145.

The code storage module 2145 is connected to the subdivision control module 2085, the Huffman coding module 1635, and the Huffman decoding module 1655 of the decoding device 1650, and receives the output code 1640. The code storage module 2145 conducts a process similar to the code storage module 2045.

The subdivision control module 2085 is connected to the code storage module 2145 and the operation information input module 1680 of the decoding device 1650, and receives the operation details 1682 from the operation information input module 1680. The subdivision control module 2085 controls the selecting of just the relevant information from among existing subdivided code from the code storage module 2145, and transmits the selected information to the decoding device 1650.

An exemplary hardware configuration of an image processing device according to an exemplary embodiment will now be described with reference to FIG. 22. The configuration illustrated in FIG. 22 may be realized by a personal computer (PC), for example, and illustrates an exemplary hardware configuration equipped with a data reading unit 2217 such as a scanner, and a data output unit 2218 such as a printer.

The central processing unit (CPU) 2201 is a controller that executes processing in accordance with a computer program stating execution sequences of the various modules described in the foregoing exemplary embodiments, such as the first data subdividing module 115, the second data subdividing module 120, the difference computing module 125, the coding module 135, the decoding module 155, the difference adding module 160, the image transform module 610, the image inverse transform module 670, the DCT module 710, the tone subdividing module 715, the resolution subdividing module 720, the difference computing module 725, the Huffman coding module 735, the Huffman decoding module 755, the difference adding module 760, the inverse DCT module 770, the prediction module 1410, the tone subdividing module 1415, the resolution subdividing module 1420, the difference computing module 1425, the coding module 1435, the decoding module 1455, the difference adding module 1460, the inverse prediction module 1470, the operation information input module 1580, the subdivision control module 1585, the operation information input module 1680, the subdivision control module 1685, the subdivision control module 2085, the code storage module 2045, and the code storage module 2145.

The read-only memory (ROM) 2202 stores information such as programs and computational parameters used by the CPU 2201. The random access memory (RAM) 2203 stores information such as programs used during execution by the CPU 2201, and parameters that change as appropriate during such execution. These memory units are connected to each other by a host bus 2204 realized by a CPU bus, for example.

The host bus 2204 is connected to an external bus 2206 such as a Peripheral Component Interconnect/Interface (PCI) bus via the bridge 2205.

The keyboard 2208 and the mouse or other pointing device 2209 are input devices operated by a user. The display 2210 may be a liquid crystal display (LCD) or cathode ray tube (CRT) device, and displays various information as text and image information.

The hard disk drive (HDD) 2211 houses and drives a hard disk, causing programs executed by the CPU 2201 and information to be recorded thereto or retrieved therefrom. Information such as the input image 105, the second subdivided image 122, the output code 140, the difference image 157, and the output image 195 is stored on the hard disk. Additionally, various other computer programs such as various data processing programs are stored therein.

The drive 2212 reads out data or programs recorded onto a removable recording medium 2213 such as an inserted magnetic disk, optical disc, magneto-optical disc, or semiconductor memory, and supplies the data or programs to the RAM 2203 connected via the interface 2207, the external bus 2206, the bridge 2205, and the host bus 2204. The removable recording medium 2213 is usable as a data recording area similar to a hard disk.

The connection port 2214 is a port that connects to externally connected equipment 2215, and has a USB, IEEE 1394, or similar receptacle. The connection port 2214 is connected to the CPU 2201 via the interface 2207, the external bus 2206, the bridge 2205, and the host bus 2204. The communication unit 2216 is connected to a communication link and executes data communication processing with external equipment. The data reading unit 2217 may be a scanner, for example, and executes document scanning processing. The data output unit 2218 may be a printer, for example, and executes document data output processing.

Note that the hardware configuration of an image processing device illustrated in FIG. 22 illustrates a single exemplary configuration, and that an exemplary embodiment is not limited to the configuration illustrated in FIG. 22 insofar as the configuration still enables execution of the modules described in an exemplary embodiment. For example, some modules may also be realized with special-purpose hardware (such as an application-specific integrated circuit (ASIC), for example), and some modules may be configured to reside within an external system and be connected via a communication link. Furthermore, it may also be configured such that multiple instances of the system illustrated in FIG. 22 are connected to each other by a communication link and operate in conjunction with each other. Additionally, an exemplary embodiment may also be built into a device such as a photocopier, fax machine, scanner, printer, or multi-function device (that is, an image processing device having two or more from among scanning, printing, copying, and faxing functions).

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

The recording medium may be a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), or a Secure Digital (SD) memory card, for example.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), an internet, an intranet, an extranet, or some combination thereof, or alternatively, by being modulated onto a carrier wave and propagated.

Furthermore, the above program may be part of another program, and may also be recorded to a recording medium together with other separate programs. The above program may also be recorded in a split manner across multiple recording media. The above program may also be recorded in a compressed, encrypted, or any other recoverable form.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
   a first subdividing unit that subdivides an image;
   a second subdividing unit that subdivides an image subdivided by the first subdividing unit along an axis that is independent from an axis of subdivision by the first subdividing unit, each of the axes being one of resolution and tone;
   a differential unit that generates a difference between an image subdivided by the second subdividing unit and an image stored in an image storage unit;
   a coding unit that codes a difference image generated by the differential unit; and
   a controller that controls processing by the first subdividing unit or the second subdividing unit according to an operation on a device that outputs an image coded by the coding unit, or a performance of the device.

2. The image processing device according to claim 1, wherein
   the axis of subdivision by the second subdividing unit differs from the axis of subdivision by the first subdividing unit.

3. The image processing device according to claim 1, wherein
   the differential unit stores a difference output as a processing result in the image storage unit, and acquires from the image storage unit a difference output as a previous processing result.

4. The image processing device according to claim 1, further comprising:
   a transform unit that transforms an image;
   wherein the first subdividing unit subdivides an image transformed by the transform unit.

5. The image processing device according to claim 1, further comprising:
   a storage that stores a code output as a processing result from the coding unit, wherein
   the controller controls selection of the code stored in the storage according to the operation on the device that outputs the image coded by the coding unit, or the performance of the device.

6. An image processing method comprising:
   conducting a first subdividing that subdivides an image;
   conducting a second subdividing that subdivides an image subdivided by the first subdividing along an axis that is independent from an axis of subdivision by the first subdividing, each of the axes being one of resolution and tone;
   generating a difference between an image subdivided by the second subdividing and an image stored in an image storage unit;
   coding a difference image generated by the generating; and
   controlling the conducting according to an operation on a device that outputs an image coded by the coding, or a performance of the device.

7. A non-transitory computer readable medium storing a program causing a computer to execute a process for processing an image, the process comprising:
   conducting a first subdividing that subdivides an image;

conducting a second subdividing that subdivides an image subdivided by the first subdividing along an axis that is independent from an axis of subdivision by the first subdividing, each of the axes being one of resolution and tone;

generating a difference between an image subdivided by the second subdividing and an image stored in an image storage unit;

coding a difference image generated by the generating; and controlling the conducting according to an operation on a device that outputs an image coded by the coding, or a performance of the device.

\* \* \* \* \*